(12) United States Patent
Shimokawa et al.

(10) Patent No.: US 10,523,056 B2
(45) Date of Patent: Dec. 31, 2019

(54) POWER RECEIVER AND POWER TRANSMISSION SYSTEM

(71) Applicant: FUJITSU LIMITED, Kawasaki-shi, Kanagawa (JP)

(72) Inventors: Satoshi Shimokawa, Kawasaki (JP); Akiyoshi Uchida, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 420 days.

(21) Appl. No.: 15/581,303

(22) Filed: Apr. 28, 2017

(65) Prior Publication Data
US 2017/0229923 A1    Aug. 10, 2017

Related U.S. Application Data

(63) Continuation of application No. PCT/JP2014/079471, filed on Nov. 6, 2014.

(51) Int. Cl.
*H01F 27/42* (2006.01)
*H01F 37/00* (2006.01)
(Continued)

(52) U.S. Cl.
CPC ............ *H02J 50/12* (2016.02); *H02J 7/025* (2013.01); *H02J 50/40* (2016.02); *H02J 50/80* (2016.02); *H04B 5/0037* (2013.01); *H02J 50/50* (2016.02)

(58) Field of Classification Search
CPC .. H02J 50/12; H02J 50/40; H02J 50/80; H02J 7/025; H02J 50/50; H04B 5/0037
(Continued)

(56) References Cited

U.S. PATENT DOCUMENTS

| 5,450,305 A | 9/1995 | Boys | |
|---|---|---|---|
| 2011/0006612 A1* | 1/2011 | Kozakai | H02J 50/80 307/104 |

(Continued)

FOREIGN PATENT DOCUMENTS

| JP | 3178837 B2 | 6/2001 |
|---|---|---|
| JP | 2011-019291 A1 | 1/2011 |

(Continued)

OTHER PUBLICATIONS

Extended European Search Report for counterpart EPC Patent Application No. 14905373.8 dated Sep. 20, 2017 (14 Sheets).
(Continued)

*Primary Examiner* — Rexford N Barnie
*Assistant Examiner* — Toan T Vu
(74) *Attorney, Agent, or Firm* — Kratz, Quintos & Hanson, LLP

(57) ABSTRACT

A power receiver includes a secondary-side resonance coil including a resonance coil part to receive power from a primary-side resonance coil by magnetic resonance; a capacitor in the resonance coil part of the secondary-side resonance coil; a series circuit of first and second switches connected in parallel with the capacitor; a first rectifier connected in parallel with the first switch, and having a first rectification direction; a second rectifier connected in parallel with the second switch, and having a second rectification direction opposite to the first rectification direction; a detector to detect a waveform of a power supply supplied to the secondary-side resonance coil; and a controller to adjust the waveform, and a phase difference between first and second signals to switch on and off the first and second switches, respectively, to adjust the power to be received by the secondary-side resonance coil.

11 Claims, 23 Drawing Sheets

(51) Int. Cl.
　　*H01F 38/00*　　(2006.01)
　　*H02J 50/12*　　(2016.01)
　　*H02J 50/40*　　(2016.01)
　　*H02J 7/02*　　(2016.01)
　　*H04B 5/00*　　(2006.01)
　　*H02J 50/80*　　(2016.01)
　　*H02J 50/50*　　(2016.01)

(58) Field of Classification Search
　　USPC .............. 307/104; 320/108, 109; 445/41.1; 700/298
　　See application file for complete search history.

(56) References Cited

U.S. PATENT DOCUMENTS

| | | | |
|---|---|---|---|
| 2011/0053500 A1* | 3/2011 | Menegoli | H02J 5/005 |
| | | | 455/41.1 |
| 2011/0221277 A1 | 9/2011 | Boys | |
| 2012/0217111 A1 | 8/2012 | Boys | |
| 2014/0035382 A1 | 2/2014 | Covic | |
| 2017/0126067 A1* | 5/2017 | Koizumi | B60L 11/182 |

FOREIGN PATENT DOCUMENTS

| | | |
|---|---|---|
| JP | 2011-151989 A1 | 8/2011 |
| JP | 2011-239655 A1 | 11/2011 |
| JP | 2012-502618 A1 | 1/2012 |
| JP | 2012-039707 A1 | 2/2012 |
| JP | 2012-253964 A1 | 12/2012 |
| JP | 2013-504298 A1 | 2/2013 |
| JP | 2014-023324 A1 | 2/2014 |
| JP | 2014-143776 A1 | 8/2014 |
| WO | 93/04527 A1 | 3/1993 |
| WO | 2014007656 A1 | 1/2014 |

OTHER PUBLICATIONS

Korean Office Action for corresponding KR Patent Application No. 10-2017-7011781, dated Jun. 12, 2018 (16 Sheets).
International Search Report for International Application No. PCT/JP2014/079471 dated Jan. 6, 2015 (present case).
International Search Report for International Application No. PCT/JP2015/054891 dated Apr. 28, 2015 (related case).
International Search Report for International Application No. PCT/JP2015/054892 dated Apr. 28, 2015 (related case).
S. Shimokawa, et al.; "Efficiency Control by Using Switching Devices for Resonant-Type Wireless Power Transfer;" (4 Sheets).

* cited by examiner

TRANSMISSION POWER 18.75 W

TRANSMISSION POWER 12.5 W

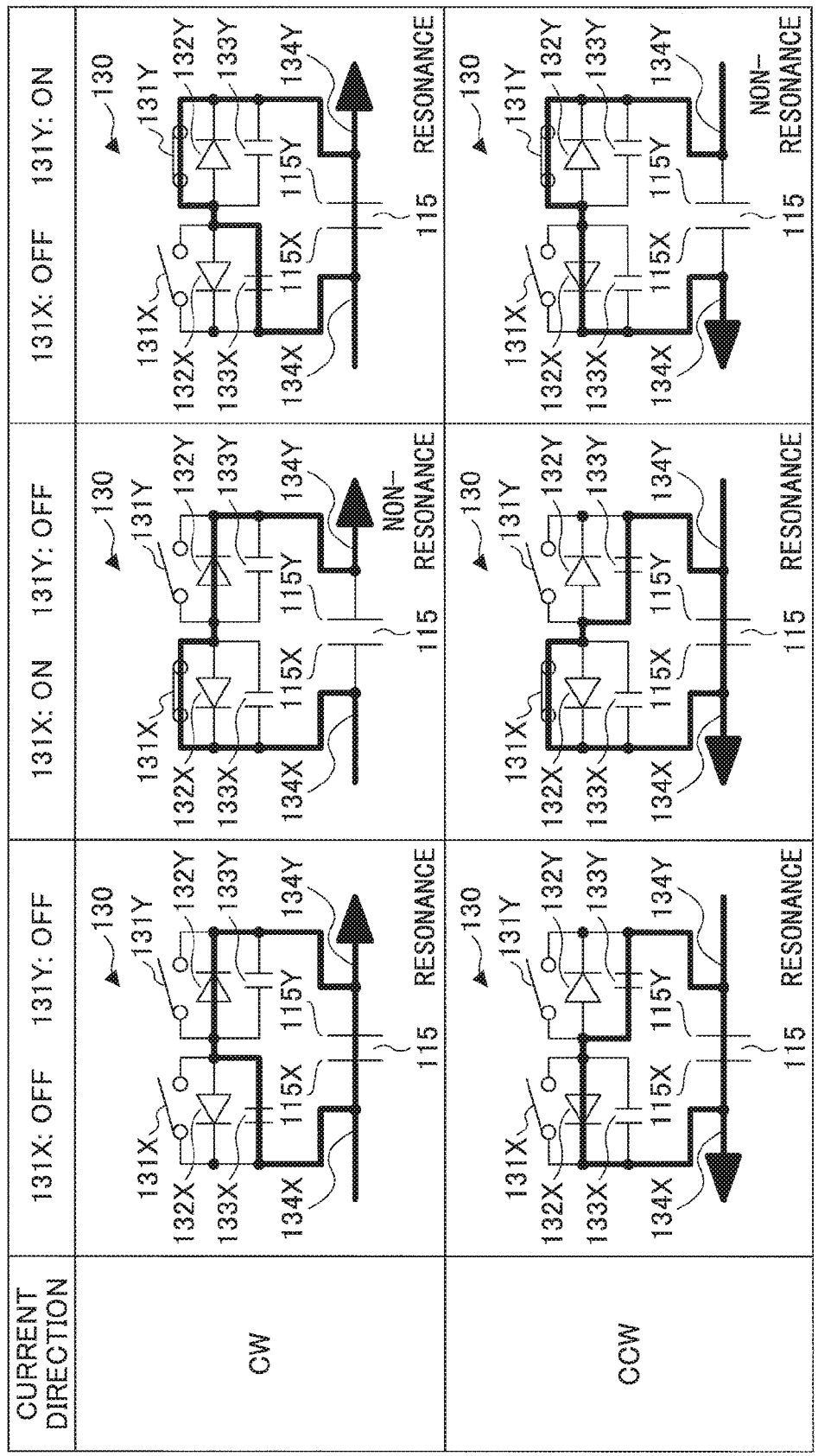

FIG.13A

| $M_{TB}$ \ $M_{TA}$ | $M_{TA1}$ | $M_{TA2}$ | $M_{TA3}$ | ... |
|---|---|---|---|---|
| $M_{TB1}$ | PD1A | PD2A | PD3A | |
| $M_{TB2}$ | PD11A | PD12A | PD13A | |
| ⋮ | | | | |

FIG.13B

| $M_{TB}$ \ $M_{TA}$ | $M_{TA1}$ | $M_{TA2}$ | $M_{TA3}$ | ... |
|---|---|---|---|---|
| $M_{TB1}$ | PD1B | PD2B | PD3B | |
| $M_{TB2}$ | PD11B | PD12B | PD13B | |
| ⋮ | | | | |

FIG.14A

| $M_{TA1}$ | $E_{A1}$ |
|---|---|
| $M_{TA2}$ | $E_{A2}$ |
| ⋮ | ⋮ |

FIG.14B

| $M_{TB1}$ | $E_{B1}$ |
|---|---|
| $M_{TB2}$ | $E_{B2}$ |
| ⋮ | ⋮ |

FIG.24

| COMBINATIONS OF Y1 TO YN | | | | COMBINATIONS OF PD1 TO PDN | | | |
|---|---|---|---|---|---|---|---|
| Ya1 | Ya2 | ... | YaN | PDa1 | PDa2 | ... | PDaN |
| Yb1 | Yb2 | ... | YbN | PDb1 | PDb2 | ... | PDbN |
| | | ... | | | | ... | |

POWER RECEIVER AND POWER TRANSMISSION SYSTEM

CROSS-REFERENCE TO RELATED APPLICATIONS

This application is a continuation application of International Application PCT/JP2014/079471 filed on Nov. 6, 2014, and designated the U.S., the entire contents of which are incorporated herein by reference.

FIELD

The present disclosure relates to a power receiver and a power transmission system.

BACKGROUND

Conventionally, there has been a contactless electric power receiving device that includes a resonance element to receive supply of AC power without contact from another resonance element supplying the electric power by resonance; a driven element to receive supply of the AC power from the resonance element by electromagnetic induction; a rectification circuit to generate DC power from the AC power from the driven element and to output the DC power; and a switching circuit to switch between supplying and not supplying the AC power to the rectification circuit (see, for example, Patent document 1).

RELATED-ART DOCUMENTS

Patent Documents

[Patent Document 1] Japanese Laid-Open Patent Application No. 2011-019291

Such a conventional contactless power receiving device (power receiver) does not take into consideration the power reception efficiency when the resonance element receives the power transmitted to the power receiver. If the power reception efficiency can be adjusted, it is possible to transmit power efficiently between the power transmitter and the power receiver.

SUMMARY

According to an embodiment, a power receiver includes a secondary-side resonance coil including a resonance coil part to receive power from a primary-side resonance coil by magnetic resonance generated with the primary-side resonance coil; a capacitor inserted in series in the resonance coil part of the secondary-side resonance coil; a series circuit constituted with a first switch and a second switch, and connected in parallel with the capacitor; a first rectifier connected in parallel with the first switch, and having a first rectification direction; a second rectifier connected in parallel with the second switch, and having a second rectification direction opposite to the first rectification direction; a detector configured to detect a voltage waveform or a current waveform of a power supply supplied to the secondary-side resonance coil; and a controller configured to adjust the voltage waveform or the current waveform detected by the detector, and a phase difference between a first signal to switch on and off the first switch and a second signal to switch on and off the second switch, so as to adjust the power to be received by the secondary-side resonance coil.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 6 is a diagram illustrating current paths in a capacitor 115 and an adjuster 130;

FIGS. 13A-13B are diagrams illustrating table data in which the phase difference is associated with a relationship between a mutual inductance $M_{TA}$ and a mutual inductance $M_{TB}$;

FIGS. 14A-14B are table data in which the mutual inductances $M_{TA}$ and $M_{TB}$ are associated with the power reception efficiency, respectively;

FIG. 24 is a diagram illustrating tabular format data used in the third embodiment.

DESCRIPTION OF EMBODIMENTS

In the following, embodiments will be described in which a power receiver and a power transmission system are used according to the present invention.

It is possible to provide a power receiver and a power transmission system that can adjust the power reception efficiency.

First Embodiment

Before describing the first embodiment that uses the power receiver and power transmission system of the present invention, prerequisite technologies of the power receiver and the power transmission system in the first embodiment will be described using FIG. 1 through FIG. 3.

Figure 1:
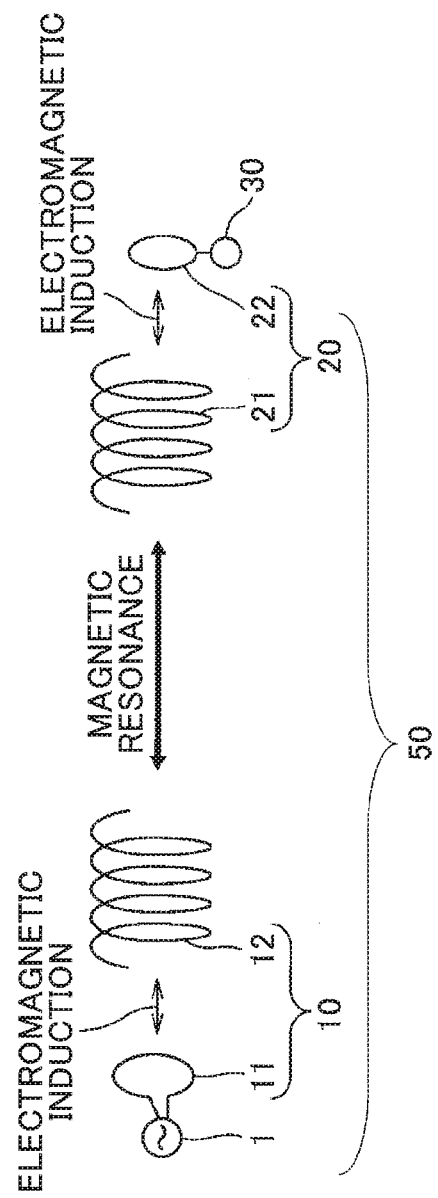
FIG. 1 is a diagram illustrating a power transmission system 50.

FIG. 1 is a diagram illustrating a power transmission system 50.

As illustrated in FIG. 1, the power transmission system 50 includes an AC power supply 1, a power transmitter 10 on a primary side (power transmitting side), and a power receiver 20 on a secondary side (power receiving side). The power transmission system 50 may also include multiple power transmitters 10 and power receivers 20.

The power transmitter 10 has a primary-side coil 11 and a primary-side resonance coil 12. The power receiver 20 has a secondary-side resonance coil 21 and a secondary-side coil 22. A load device 30 is connected to the secondary-side coil 22.

As illustrated in FIG. 1, the power transmitter 10 and the power receiver 20 executes transmission of energy (electric power) from the power transmitter 10 to the power receiver 20 by magnetic resonance between the primary-side resonance coil (an LC resonator) 12 and the power receiving resonance coil (an LC resonator) 21. Here, although it is possible to transmit power from the primary-side resonance coil 12 to the secondary-side resonance coil 21 not only by magnetic resonance, but also by electrical resonance or the like, magnetic resonance will be mainly described as an example in the following description.

Also, the first embodiment will be described with an example case where the frequency of the AC voltage output by the AC power supply 1 is 6.78 MHz, and the resonance frequency of the primary-side resonance coil 12 and the secondary-side resonance coil 21 is 6.78 MHz.

Note that the power transmission from the primary-side coil 11 to the primary-side resonance coil 12 is executed using electromagnetic induction, and the power transmission from the secondary-side resonance coil 21 to the secondary-side coil 22 is also executed using electromagnetic induction.

Also, although FIG. 1 illustrates an example in which the power transmission system 50 includes the secondary-side coil 22, the power transmission system 50 is not required to include the secondary-side coil 22, and in such a case, the load device 30 may be directly connected to the secondary-side resonance coil 21.

Figure 2:
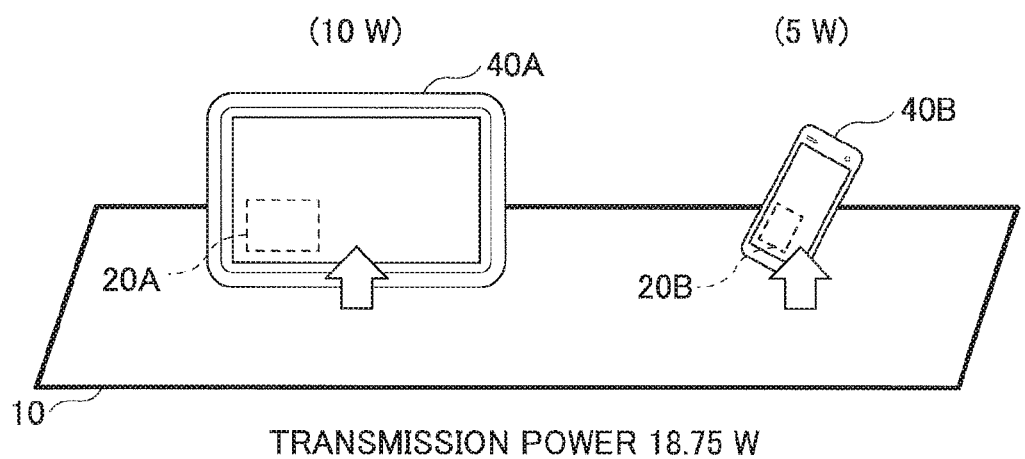
FIG. 2 is a diagram illustrating a state in which a power transmitter 10 transmits power to electronic devices 40A and 40B by magnetic resonance.

FIG. 2 is a diagram illustrating a state where power is transmitted from the power transmitter 10 to electronic devices 40A and 40B by magnetic resonance.

The electronic devices 40A and 40B are a tablet computer and a smartphone, respectively, and have power receivers 20A and 20B built in, respectively. The power receivers 20A and 20B have a configuration similar to that of the power receiver 20 illustrated in FIG. 1, but the secondary-side coil 22 is removed. In other words, the power receivers 20A and 20B have the secondary-side resonance coil 21. Note that although FIG. 2 illustrates the power transmitter 10 in a simplified way, the power transmitter 10 is connected to the AC power supply 1 (see FIG. 1).

In FIG. 2, the electronic devices 40A and 40B are placed at respective positions having the same distance from the power transmitter 10, and the built-in power receivers 20A and 20B receive power from the power transmitter 10 at the same time in a contactless state by magnetic resonance.

Assume here that, for example, the power reception efficiency of the power receiver 20A built in the electronic device 40A is 40%, and the power reception efficiency of the power receiver 20B built in the electronic device 40B is 40% in the state illustrated in FIG. 2.

The power reception efficiency of each of the power receivers 20A and 20B is represented by the ratio of the power received by the secondary-side coil 22 in each of the power receivers 20A and 20B with respect to the power transmitted from the primary-side coil 11 connected to the AC power supply 1. Note that if the power transmitter 10 does not include the primary-side coil 11, and the primary-side resonance coil 12 is directly connected to the AC power supply 1, the received power may be obtained by using the power transmitted from the primary-side resonance coil 12 instead of the power transmitted from the primary-side coil 11. Also, if the power receivers 20A and 20B do not include the secondary-side coil 22, the received power may be obtained by using the power received by the secondary-side resonance coil 21 instead of the power received by the secondary-side coil 22.

The power reception efficiency of the power receivers 20A and 20B is determined by specifications of the coils of the power transmitter 10 and the power receivers 20A and 20B, and the distances and the orientations between the devices. In FIG. 2, the power receivers 20A and 20B have the same configuration, and are placed at positions having the same distance from the power transmitter 10 and at the same orientations. Therefore, the power reception efficiency of the power receivers 20A and 20B is equivalent to each other, for example, 40%.

Also, assume that the rated output of the electronic device 40A is 10 W and the rated output of the electronic device 40B is 5 W.

In such a case, the power transmitted from the primary-side resonance coil 12 (see FIG. 1) of the power transmitter 10 is 18.75 W. This 18.75 W is calculated by (10 W+5 W)/(40%+40%).

Note that if the power transmitter 10 transmits 18.75 W of power to the electronic devices 40A and 40B, the power receivers 20A and 20B receive 15 W of the power in total, and as the power receivers 20A and 20B receive the power evenly, each receives 7.5 W of power.

Consequently, the electronic device 40A has 2.5 W of power shortage, and the electronic device 40B has 2.5 W of power surplus.

In other words, even if the power transmitter 10 transmits 18.75 W of power to the electronic devices 40A and 40B, the electronic devices 40A and 40B cannot receive the power in a good balance. That is to say, the balance of power supply is not good when the electronic devices 40A and 40B receive the power at the same time.

Figure 3:
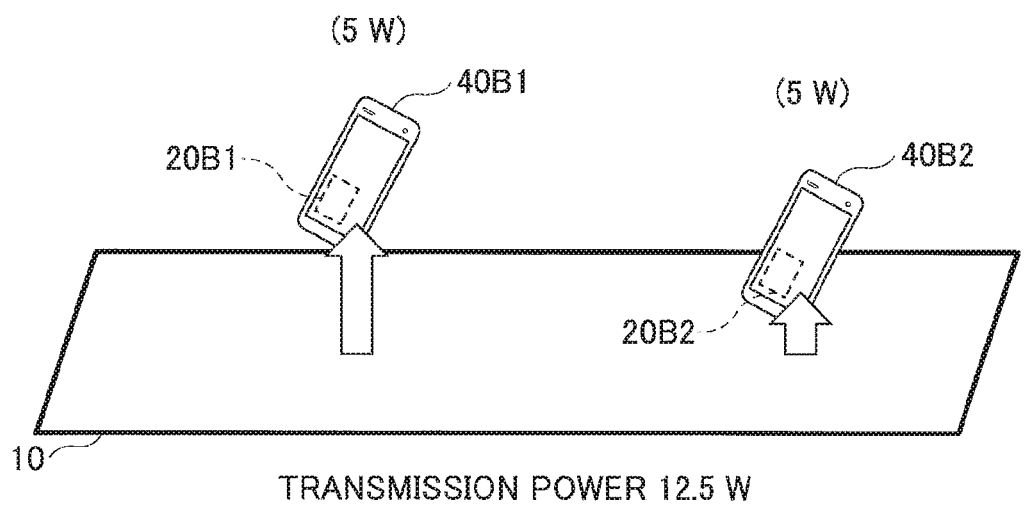
FIG. 3 is a diagram illustrating a state in which the power transmitter 10 transmits power to electronic devices 40B1 and 40B2 by magnetic resonance.

FIG. 3 is a diagram illustrating a state in which the power transmitter 10 transmits power to electronic devices 40B1 and 40B2 by magnetic resonance.

The electronic devices 40B1 and 40B2 are smartphones of the same type, and have power receivers 20B1 and 20B2 built in, respectively. The power receivers 20B1 and 20B2 are the same as the power receiver 20B illustrated in FIG. 2. In other words, the power receivers 20B1 and 20B2 have the secondary-side resonance coil 21. Note that although FIG. 3 illustrates the power transmitter 10 in a simplified way, the power transmitter 10 is connected to the AC power supply 1 (see FIG. 1).

In FIG. 3, although the angles (orientations) of the electronic devices 40B1 and 40B2 with respect to the power transmitter 10 are the same, the electronic device 40B1 is placed at a position more distant from the power transmitter 10 than the electronic device 40B2. The power receivers 20B1 and 20B2 built in the electronic devices 40B1 and 40B2 receive power from the power transmitter 10, respectively, at the same time in a contactless state by magnetic resonance.

Assume here that, for example, the power reception efficiency of the power receiver 20B1 built in the electronic device 40B1 is 35%, and the power reception efficiency of the power receiver 20B2 built in the electronic device 40B2 is 45% in the state illustrated in FIG. 3.

Here, since the angles (orientations) of the electronic devices 40B1 and 40B2 with respect to the power transmitter 10 are equivalent, the power reception efficiency of each of the power receivers 20B1 and 20B2 is determined by the distance between the power transmitter 10 and each of the power receivers 20B1 and 20B2. Therefore, in FIG. 3, the power reception efficiency of the power receiver 20B1 is lower than the power reception efficiency of the power receiver 20B2. Note that both the electronic devices 40B1 and 40B2 have the rated output of 5 W.

In such a case, the power transmitted from the primary-side resonance coil 12 (see FIG. 1) of the power transmitter 10 is 12.5 W. This 12.5 W is calculated by (5 W+5 W)/(35%+45%).

Note that if the power transmitter 10 transmits 12.5 W of power to the electronic devices 40B1 and 40B2, the power receivers 20B1 and 20B2 receive 10 W of the power in total. Also, in FIG. 3, since the power reception efficiency of the power receiver 20B1 is 35% and the power reception efficiency of the power receiver 20B2 is 45%, the power receiver 20B1 receives 4.4 W of the power and the power receiver 20B2 receives 5.6 W of the power.

Consequently, the electronic device 40B1 has 0.6 W of power shortage, and the electronic device 40B2 has 0.6 W of power surplus.

In other words, even if the power transmitter 10 transmits 12.5 W of power to the electronic devices 40B1 and 40B2, the electronic devices 40B1 and 40B2 cannot receive the power in a good balance. That is to say, the balance of power supply is not good when the electronic devices 40B1 and 40B2 receive the power at the same time (there is room for the improvement).

Note that here, the balance of power supply has been described in the case where the angles (orientations) of the electronic devices 40B1 and 40B2 with respect to the power transmitter 10 are the same, and the distances from the power transmitter 10 to the electronic devices 40B1 and 40B2 are different.

However, the power reception efficiency is determined by the distance and the angle (orientation) of each of the power receivers 20B1 and 20B2 with respect to the power transmitter 10. Therefore, if the angles (orientations) of the electronic devices 40B1 and 40B2 are different in the positional relationship illustrated in FIG. 3, the power reception efficiency of the power receivers 20B1 and 20B2 take values different from 35% and 45% described above.

Also, even if the distances from the power transmitter 10 of the electronic devices 40B1 and 40B2 are the same, if the angles (orientations) of the electronic devices 40B1 and 40B2 with respect to the power transmitter 10 are different, the power reception efficiency of the power receivers 20B1 and 20B2 take values different from each other.

Thus, as illustrated in FIG. 2, when transmitting power by magnetic resonance at the same time from the power transmitter 10 to the electronic devices 40A and 40B having different rated output, it is difficult for the electronic devices 40A and 40B to receive the power in a good balance.

Also, as illustrated in FIG. 3, even if the rated output is equivalent between the electronic devices 40B1 and 40B2, if the angles (orientations) of the electronic devices 40B1 and 40B2 with respect to the power transmitter 10 are different, the power reception efficiency is different between the power receivers 20B1 and 20B2, and hence, it is difficult for the electronic devices 40B1 and 40B2 to receive the power in a good balance.

Also, in FIG. 2 and FIG. 3, cases have been described where the electronic devices 40A and 40B or the electronic devices 40B1 and 40B2 receive power at the same time, respectively. However, multiple electronic devices such as the electronic devices 40A and 40B or the electronic devices 40B1 and 40B2 may receive power at different timings in a time sharing manner.

However, if multiple electronic devices receive power at different timings in a time sharing manner, a problem may occur in that it takes a long time for all the electronic devices to complete the power reception because while one electronic device is receiving the power, the other electronic devices cannot receive the power.

Next, a power receiver and a power transmission system in the first embodiment will be described using FIG. 4 through FIG. 9.

Figure 4:
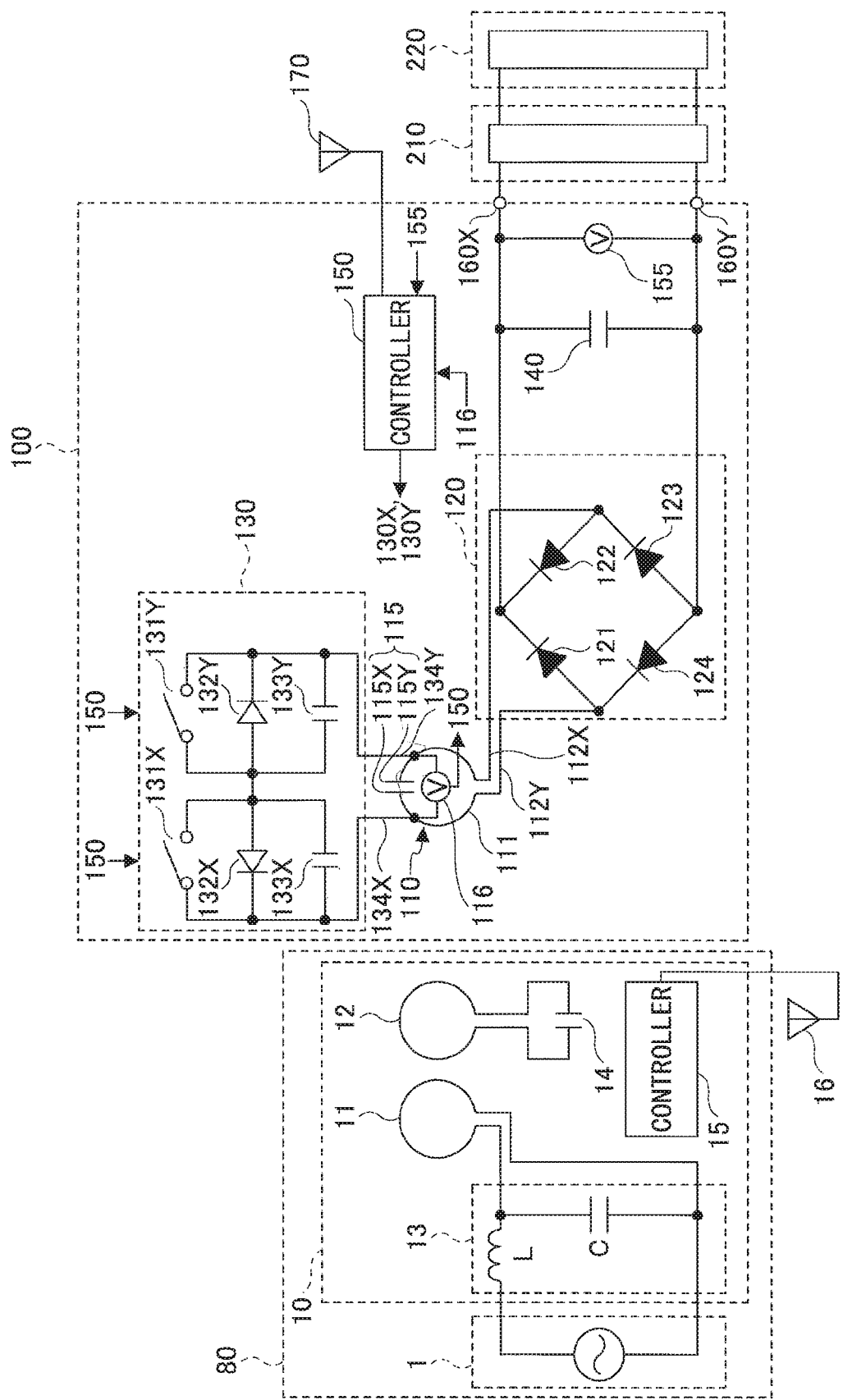
FIG. 4 is a diagram illustrating a power receiver 100 and a power transmission apparatus 80 according to a first embodiment.

FIG. 4 is a diagram illustrating a power receiver 100 and a power transmission apparatus 80 according to the first embodiment. The power transmission apparatus 80 includes an AC power supply 1 and a power transmitter 10. Although the AC power supply 1 and the power transmitter 10 are substantially the same as those illustrated in FIG. 1, FIG. 4 illustrates the configuration in more detail.

The power transmission apparatus 80 includes the AC power supply 1 and the power transmitter 10.

The power transmitter 10 has a primary-side coil 11, a primary-side resonance coil 12, a matching circuit 13, a capacitor 14, a controller 15, and an antenna 16.

The power receiver 100 includes a secondary-side resonance coil 110, a capacitor 115, a voltmeter 116, a rectification circuit 120, an adjuster 130, a smoothing capacitor 140, a controller 150, a voltmeter 155, output terminals 160X and 160Y, and an antenna 170. A DC-DC converter 210 is connected to the output terminals 160X and 160Y, and a battery 220 is connected on the output side of the DC-DC converter 210.

First, the power transmitter 10 will be described. As illustrated in FIG. 4, the primary-side coil 11 is a loop-shaped coil, and has both terminals connected to the AC power supply 1 via the matching circuit 13. The primary-side coil 11 is contactless with the primary-side resonance coil 12 and placed close to each other, to form electromagnetic coupling with the primary-side resonance coil 12. The primary-side coil 11 is disposed so that its central axis corresponds to the central axis of the primary-side resonance coil 12. The reason why the central axes are caused to correspond to each other is to increase the strength of the coupling between the primary-side coil 11 and the primary-side resonance coil 12, and to prevent a leak of magnetic flux so as to avoid an electromagnetic field unnecessarily generated around the primary-side coil 11 and the primary-side resonance coil 12.

The primary-side coil 11 generates a magnetic field by AC power supplied from the AC power supply 1 through the matching circuit 13, and transmits the power to the primary-side resonance coil 12 by electromagnetic induction (mutual induction).

As illustrated in FIG. 4, the primary-side resonance coil 12 is contactless with the primary-side coil 11 and placed close to each other, to form the electromagnetic coupling with the primary-side coil 11. Also, the primary-side resonance coil 12 is designed to have a predetermined resonance frequency and to have a high Q value. The resonance frequency of the primary-side resonance coil 12 is set to be equivalent to the resonance frequency of the secondary-side resonance coil 110. The capacitor 14 is connected in series between both terminals of the primary-side resonance coil 12, to adjust the resonance frequency.

The resonance frequency of the primary-side resonance coil 12 is set to be the same frequency as the frequency of the AC power output by the AC power supply 1. The resonance frequency of the primary-side resonance coil 12 is determined by the inductance of the primary-side resonance coil 12 and the electrostatic capacitance of the capacitor 14. Therefore, the inductance of the primary-side resonance coil 12 and the electrostatic capacitance of the capacitor 14 are set so as to make the resonance frequency of the primary-side resonance coil 12 equivalent to the frequency of the AC power output from the AC power supply 1.

The matching circuit 13 is inserted for impedance matching between the primary-side coil 11 and the AC power supply 1, and includes an inductor L and a capacitor C.

The AC power supply 1 is a power supply that outputs AC power at a frequency required for magnetic resonance, and has an amplifier built in to amplify the output power. The AC power supply 1 outputs the AC power at a high frequency, for example, about hundreds of kHz to tens of MHz.

The capacitor 14 is a variable capacitor inserted in series between both terminals of the primary-side resonance coil 12. The capacitor 14 is provided to adjust the resonance frequency of the primary-side resonance coil 12, and its electrostatic capacitance is set by the controller 15.

The controller 15 controls the output voltage and the output frequency of the AC power supply 1, controls the electrostatic capacitance of the capacitor 14, and the like. Also, the controller 15 executes data communication with the power receiver 100 through the antenna 16.

The power transmission apparatus 80 as described above transmits the AC power supplied from the AC power supply 1 to the primary-side coil 11, to the primary-side resonance coil 12 by magnetic induction, and transmits the power from the primary-side resonance coil 12 to the secondary-side resonance coil 110 of the power receiver 100 by magnetic resonance.

Next, the secondary-side resonance coil 110 included in the power receiver 100 will be described. Assume here that, for example, the resonance frequency is 6.78 MHz in the following description.

The secondary-side resonance coil 110 is designed to have the same resonance frequency as the primary-side resonance coil 12, and to have a high Q value. The secondary-side resonance coil 110 has a resonance coil part 111 and terminals 112X and 112Y. Although the resonance coil part 111 is substantially the same as the secondary-side resonance coil 110, here, the secondary-side resonance coil 110 is assumed to be the resonance coil part 111 having the terminals 112X and 112Y provided at both ends.

The resonance coil part 111 has the capacitor 115 inserted in series to adjust the resonance frequency. Also, the capacitor 115 has the adjuster 130 connected in parallel. Also, the resonance coil part 111 has the terminals 112X and 112Y provided at both ends. The terminals 112X and 112Y are connected to the rectification circuit 120. The terminals 112X and 112Y are examples of a first terminal and a second terminal, respectively.

The secondary-side resonance coil 110 is connected to the rectification circuit 120 without an intervening secondary-side coil. In a state ready to generate the resonance by the adjuster 130, the secondary-side resonance coil 110 outputs the AC power transmitted from the primary-side resonance coil 12 of the power transmitter 10 by magnetic resonance, to the rectification circuit 120.

The capacitor 115 is inserted in series with the resonance coil part 111, to adjust the resonance frequency of the secondary-side resonance coil 110. The capacitor 115 has terminals 115X and 115Y. Also, the capacitor 115 has the adjuster 130 connected in parallel.

The voltmeter 116 is connected in parallel with the capacitor 115, to measure the voltage between both terminals of the capacitor 115. The voltmeter 116 detects the voltage of the AC power received by the secondary-side resonance coil 110, and transmits a signal representing the voltage to the controller 150. The AC voltage measured by the voltmeter 116 is used for synchronizing driving signals that drive switches 131X and 131Y.

The rectification circuit 120 has four diodes 121-124. The diodes 121-124 are connected in a bridge shape, and apply full-wave rectification to the power input from the secondary-side resonance coil 110, to output the rectified power.

The adjuster 130 is connected in parallel with the capacitor 115 in the resonance coil part 111 of the secondary-side resonance coil 110.

The adjuster 130 has the switches 131X and 131Y, diodes 132X and 132Y, capacitors 133X and 133Y, and terminals 134X and 134Y.

The switches 131X and 131Y are connected in series to each other between the terminals 134X and 134Y. The switches 131X and 131Y are examples of a first switch and a second switch, respectively. The terminals 134X and 134Y are connected to the terminals 115X and 115Y of the capacitor 115, respectively. Therefore, the series circuit of the switches 131X and 131Y is connected in parallel with the capacitor 115.

The diode 132X and the capacitor 133X are connected in parallel with the switch 131X. The diode 132Y and the capacitor 133Y are connected in parallel with the switch 131Y. The diodes 132X and 132Y have their respective cathodes connected to each other, and have their respective anodes connected to the capacitor 115. In other words, the diodes 132X and 132Y are connected so that the respective rectification directions are opposite to each other.

Note that the diodes 132X and 132Y are examples of a first rectifier and a second rectifier, respectively. Also, the adjuster 130 is not required to include the capacitors 133X and 133Y.

As the switch 131X, the diode 132X, and the capacitor 133X, FETs (Field Effect Transistors) may be used, for example. In this case, the body diode between the drain and source of a P-channel or N channel FET just needs to be connected to have the rectification direction of the diode 132X as in the figure. If using an N-channel FET, the source corresponds to the anode of the diode 132X and the drain corresponds to the cathode of the diode 132X.

Also, the switch 131X is implemented by switching the connection state between the drain and the source by receiving the driving signal output from the controller 150 as input into the gate. Also, the capacitor 133X is implemented by the parasitic capacitance between the drain and the source.

Similarly, as the switch 131Y, the diode 132Y, and the capacitor 133Y, FETs may be used, for example. In this case, the body diode between the drain and source of a P-channel or N channel FET just needs to be connected to have the rectification direction of the diode 132Y as in the figure. If using an N-channel FET, the source corresponds to the anode of the diode 132Y and the drain corresponds to the cathode of the diode 132Y.

Also, the switch 131Y is implemented by switching the connection state between the drain and the source by receiving the driving signal output from the controller 150 as input into the gate. Also, the capacitor 133Y is implemented by the parasitic capacitance between the drain and the source.

Note that the switch 131X, the diode 132X, and the capacitor 133X are not limited to those implemented by FETs, but may be implemented by having a switch, a diode, and a capacitor connected in parallel. This is the same for the switch 131Y, the diode 132Y, and the capacitor 133Y.

The switches 131X and 131Y can be turned on and off in the phases opposite to each other. When the switch 131X is turned off and the switch 131Y is turned on, the power receiver 100 is in a state where a resonance current may flow in the adjuster 130 in a direction going from the terminal 134X to the terminal 134Y through the capacitor 133X and the switch 131Y, and the resonance current may flow in the capacitor 115 from the terminal 115X to the terminal 115Y. In other words, the power receiver 100 in FIG. 4 transitions to a state where the resonance current may flow in the secondary-side resonance coil 110 in the clockwise direction.

Also, when the switch 131X is turned on and the switch 131Y is turned off, the current path generated in the adjuster 130 goes from the terminal 134X to the terminal 134Y through the switch 131X and the diode 132Y. Since this current path is parallel with the capacitor 115, the current stops flowing in the capacitor 115.

Therefore, if the power receiver 100 transitions from a state where the switch 131X is turned off, the switch 131Y is turned on, and hence, the resonance current flows in the secondary-side resonance coil 110 in the clockwise direction, to a state where the switch 131X is turned on and the switch 131Y is turned off, the resonance current stops occurring. This is because the capacitor is no longer included in the current path.

When the switch 131X is turned on and the switch 131Y is turned off, the power receiver 100 is in a state where a resonance current may flow in the adjuster 130 in a direction going from the terminal 134Y to the terminal 134X through the capacitor 133Y and the switch 131X, and the resonance current may flow in the capacitor 115 from the terminal 115Y to the terminal 115X. In other words, the power receiver 100 in FIG. 4 transitions to a state where the resonance current may flow in the secondary-side resonance coil 110 in the counterclockwise direction.

Also, when the switch 131X is turned on and the switch 131Y is turned off, the current path generated in the adjuster 130 goes from the terminal 134Y to the terminal 134X through the switch 131Y and the diode 132X. Since this current path is parallel with the capacitor 115, the current stops flowing in the capacitor 115.

Therefore, if the power receiver 100 transitions from a state where the switch 131X is turned on, the switch 131Y is turned off, and hence, the resonance current flows in the secondary-side resonance coil 110 in the counterclockwise direction, to a state where the switch 131X is turned off and the switch 131Y is turned on, the resonance current stops occurring. This is because the capacitor is no longer included in the current path.

The adjuster 130 switches the switches 131X and 131Y as described above to switch between a state where the resonance current may be generated, and a state where the resonance current is not generated. Switching the switches 131X and 131Y is executed by the driving signals output from the controller 150.

The frequency of the driving signal is set to the AC frequency received by the secondary-side resonance coil 110.

The switches 131X and 131Y cut off the AC current at a high frequency as described above. For example, the adjuster 130 having two FETs combined can cut off the AC current at high speed.

Note that the driving signal and operations of the adjuster 130 will be described later using FIG. 6.

The smoothing capacitor 140 is connected on the output side of the rectification circuit 120, to smooth the power having full-wave rectification applied to in the rectification circuit 120, and to output it as DC power. The output terminals 160X and 160Y are connected on the output side of the smoothing capacitor 140. Although the power having full-wave rectification applied to in the rectification circuit 120 can be treated as AC power approximately because the negative component of the AC power has been inverted into the positive component, by using the smoothing capacitor 140, even if ripples are included in the power having full-wave rectification applied to, stable DC power can be obtained.

Note that the wiring line connecting the upper terminal of the smoothing capacitor 140 with the output terminal 160X is the wiring line on the higher voltage side, and the wiring line connecting the lower terminal of the smoothing capacitor 140 with the output terminal 160Y is the wiring line on the lower voltage side.

The controller 150 holds data that represents the rated output of the battery 220 in its internal memory. Also, in response to a request from the controller 15 of the power transmitter 10, the controller 150 measures the power received by the power receiver 100 from the power transmitter 10 (received power), and transmits the data representing the received power to the power transmitter 10 via the antenna 170.

Also, if having received data representing the phase difference from the power transmitter 10, the controller 150 generates driving signals by using the received phase difference, and drives the switches 131X and 131Y. Note that the received power may be obtained by the controller 150 based on the voltage V measured by the voltmeter 155 and the internal resistance value R of the battery 220. The received power P is obtained by $P=V^2/R$.

Figure 5:
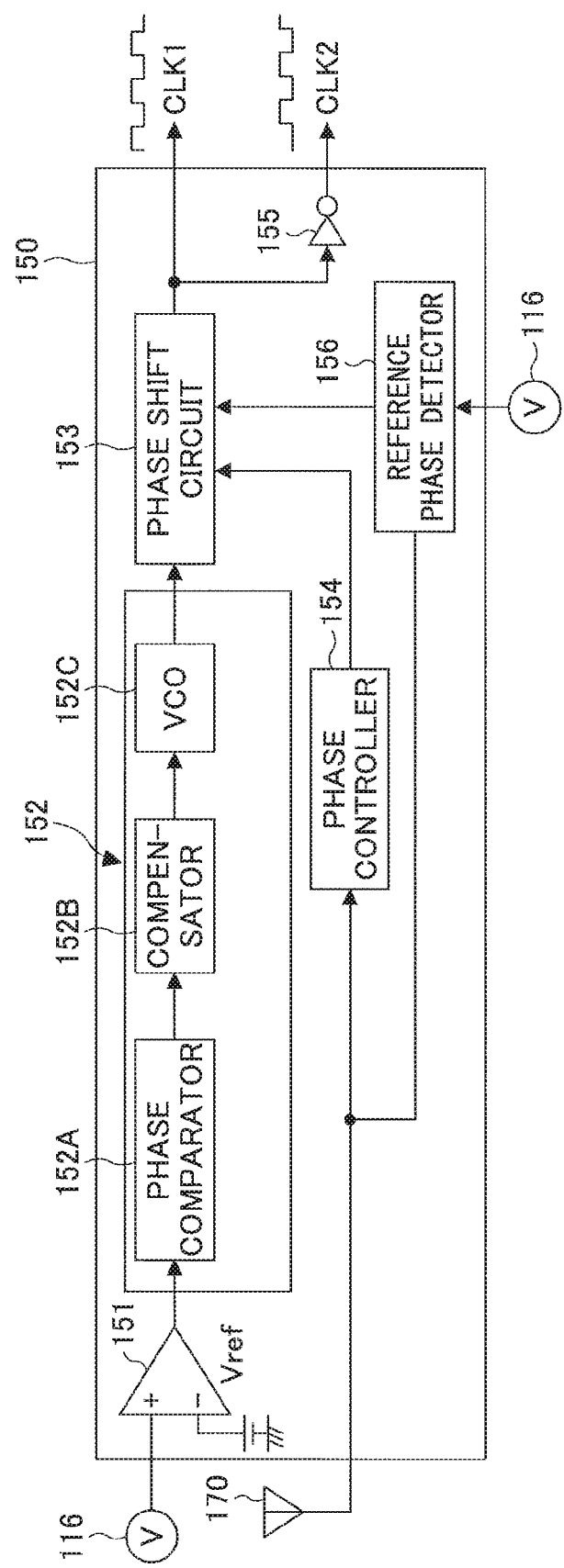
FIG. 5 is a diagram illustrating an internal configuration of a controller 150.

Here, the controller 150 will be described using FIG. 5. FIG. 5 is a diagram illustrating an internal configuration of the controller 150.

The controller 150 has a comparator 151, a PLL (Phase Locked Loop circuit) 152, a phase shift circuit 153, a phase controller 154, an inverter 155, and a reference phase detector 156.

The comparator 151 compares an AC voltage detected by the voltmeter 116 with a predetermined reference voltage Vref, and outputs a clock to the PLL 152.

The PLL 152 has a phase comparator 152A, a compensator 152B, and a VCO (Voltage Controlled Oscillator) 152C. The phase comparator 152A, the compensator 152B, and VCO 152C are connected in series, and connected to have the output of VCO 152C fed back to the phase comparator 152A. Configured as such, the PLL 152 outputs a clock that is synchronized with the signal input from the comparator 151.

The phase shift circuit 153 is connected on the output side of the PLL 152, and based on a signal representing the phase difference that is input from the phase controller 154, shifts the phase of the clock output from the PLL 152 with respect to the reference phase, and outputs the shifted clock. As the phase shift circuit 153, a phase shifter may be used, for example.

When receiving the signal representing the phase difference transmitted from the power transmitter 10 as input, the phase controller 154 converts the signal representing the phase difference into a signal for the phase shift circuit 153, and outputs the converted signal.

The clock whose phase has been shifted by the phase difference with respect to the reference phase based on the signal input from the phase controller 154, is branched off in two ways; one is output as it is as a clock referred to as CLK1, and the other is inverted by the inverter 155, and output as a clock referred to as CLK2. The clocks CLK1 and CLK2 are control signals output by the controller 150.

The reference phase detector 156 controls the amount of shift by which the phase shift circuit 153 shifts the phase of the clock, so as to adjust the phase of the clock output by the phase shift circuit 153 with respect to the clock output by the PLL 152, and to detect the phase in which the maximum power reception efficiency is obtained.

Then, the reference phase detector 156 holds the detected phase in its internal memory as the reference phase. The operating point at which the power reception efficiency reaches the maximum is a point at which the voltage value detected by the voltmeter 116 reaches the maximum. Therefore, the reference phase detector 156 adjusts the amount of shift of the phase given in the phase shift circuit 153 to detect a point at which the voltage value detected by the voltmeter 116 reaches the maximum, and holds the phase at the operating point in its internal memory as the reference phase.

Here, the clock output by the PLL 152 corresponds to the phase of the AC voltage obtained by magnetic resonance detected by the voltmeter 116. Therefore, adjusting the amount of shift of the phase given by the phase shift circuit 153 corresponding to the clock output by the PLL 152 is to control the amount of shift of the phase of the clock with respect to the voltage waveform detected by the voltmeter 116, by the phase shift circuit 153.

The reference phase is a phase of the clocks CLK1 and CLK2 with respect to the AC voltage in which the maximum power reception efficiency is obtained. To treat this reference phase as 0 degrees for adjusting the received power, the phase difference of the phase of the clocks CLK1 and CLK2 with respect to the reference phase (0 degrees) is adjusted in the phase shift circuit 153.

Here, since the phase of the AC voltage is not detected, the amount of shift of the phase given by the phase shift circuit 153 to the clocks CLK1 and CLK2 with which the maximum power reception efficiency is obtained, is treated as the reference phase.

Note that although the embodiment is described here in which the phase of the clock output from the PLL 152 is adjusted by the phase shift circuit 153 with respect to the AC voltage detected by the voltmeter 116, an ammeter may be used instead of the voltmeter 116, to adjust the phase of the clock with respect to the AC current in the phase shift circuit 153.

The voltmeter 155 is connected between the output terminals 160X and 160Y. The voltmeter 155 is used for calculating the received power of the power receiver 100. Obtaining the received power as described above based on the voltage V measured by the voltmeter 155 and the internal resistance value R of the battery 220 is a preferable measuring method because the loss is smaller than in a case of measuring the current to measure the received power. However, the received power of the power receiver 100 may also be obtained by measuring the current and the voltage. If measuring the current, a Hall device, a magneto-resistive element, a detector coil, a resistor, or the like may be used for the measurement.

The DC-DC converter 210 is connected to the output terminals 160X and 160Y to convert the voltage of the DC power output from the power receiver 100 into the rated voltage of the battery 220, and to output the converted voltage. The DC-DC converter 210 steps down the output voltage of the rectification circuit 120 to the rated voltage of the battery 220 if the output voltage of the rectification circuit 120 is higher than the rated voltage of the battery 220. Also, the DC-DC converter 210 boosts the output voltage of the rectification circuit 120 to the rated voltage of the battery 220 if the output voltage of the rectification circuit 120 is lower than the rated voltage of the battery 220.

The battery 220 just needs to be a secondary battery that can be charged repeatedly, and, for example, a lithium ion battery may be used for it. For example, if the power receiver 100 is built in an electronic device such as a tablet computer and a smart phone, the battery 220 is the main battery of such an electronic device.

Note that the primary-side coil 11, the primary-side resonance coil 12, and the secondary-side resonance coil 110 are produced, for example, by winding copper wire. However, the material of the primary-side coil 11, the primary-side resonance coil 12, and the secondary-side resonance coil 110 may be metal other than copper (for example, gold, aluminum, etc.). Also, the primary-side coil 11, the primary-side resonance coil 12, and the secondary-side resonance coil 110 may be made of different materials.

With respect to such a configuration, the primary-side coil 11 and the primary-side resonance coil 12 are on the transmitting side of the power, and the secondary-side resonance coil 110 is on the receiving side of the power.

The power is transmitted from the power transmitting side to the power receiving side by using magnetic resonance generated between the primary-side resonance coil 12 and the secondary-side resonance coil 110. Therefore, the power can be transmitted for a longer distance than by using an electromagnetic induction scheme that transmits power from the power transmitting side to the power receiving side by electromagnetic induction.

The magnetic resonance scheme has advantages over the electromagnetic induction scheme such that the degree of freedom is higher in terms of the distance or positional shift between resonance coils, and being position-free.

Next, a current path generated when the switches 131X and 131Y are driven by the driving signals will be described using FIG. 6 and FIG. 7.

FIG. 6 is a diagram illustrating current paths in the capacitor 115 and the adjuster 130. In FIG. 6, as in FIG. 4, a current direction will be referred to as the clockwise (CW) direction in which a current flows from the terminal 134X to the terminal 134Y through the capacitor 115 or the inside of the adjuster 130. Also, a current direction will be referred to as the counterclockwise (CCW) direction in which a current flows from the terminal 134Y to the terminal 134X through the capacitor 115 or the inside of the adjuster 130.

First, if the switches 131X and 131Y are both turned off and the current flows clockwise (CW), a resonance current flows in the direction from the terminal 134X to the terminal 134Y through the capacitor 133X and the diode 132Y, and the resonance current flows in the capacitor 115 from the terminal 115X to the terminal 115Y. Therefore, the resonance current flows in the secondary-side resonance coil 110 in the clockwise direction.

If the switches 131X and 131Y are both turned off and a current flows counterclockwise (CCW), a resonance current flows in the direction from the terminal 134Y to the terminal 134X through the capacitor 133Y and the diode 132X, and the resonance current flows in the capacitor 115 from the terminal 115Y to the terminal 115X. Therefore, the resonance current flows in the secondary-side resonance coil 110 in the counterclockwise direction.

If the switch 131X is turned on, the switch 131Y is turned off, and a current flows clockwise (CW), the current path generated in the adjuster 130 goes from the terminal 134X to the terminal 134Y through the switch 131X and the diode 132Y. Since this current path is parallel with the capacitor 115, the current stops flowing in the capacitor 115. Therefore, the resonance current does not flow in the secondary-side resonance coil 110. Note that in this case, even if the switch 131Y is turned on, the resonance current does not flow in the secondary-side resonance coil 110.

If the switch 131X is turned on, the switch 131Y is turned off, and a current flows counterclockwise (CCW), a resonance current flows in the adjuster 130 in the direction from the terminal 134Y to the terminal 134X through the capacitor 133Y and the switch 131X, and the resonance current flows in the capacitor 115 from the terminal 115Y to the terminal 115X. Therefore, the resonance current flows in the secondary-side resonance coil 110 in the counterclockwise direction. Note that the current also flows in the diode 132X that is parallel with the switch 131X.

If the switch 131X is turned off, the switch 131Y is turned on, and a current flows clockwise (CW), a resonance current flows in the adjuster 130 in the direction from the terminal 134X to the terminal 134Y through the capacitor 133X and the switch 131Y, and the resonance current flows in the capacitor 115 from the terminal 115X to the terminal 115Y. Therefore, the resonance current flows in the secondary-side resonance coil 110 in the clockwise direction. Note that the current also flows in the diode 132Y that is parallel with the switch 131Y.

If the switch 131X is turned off, the switch 131Y is turned on, and a current flows counterclockwise (CCW), the current path generated in the adjuster 130 goes from the terminal 134Y to the terminal 134X through the switch 131Y and the diode 132X. Since this current path is parallel with the capacitor 115, the current stops flowing in the capacitor 115. Therefore, the resonance current does not flow in the secondary-side resonance coil 110. Note that in this case, even if the switch 131X is turned on, the resonance current does not flow in the secondary-side resonance coil 110.

Note that the electrostatic capacitance that contributes to the resonance frequency of the resonance current is determined by the capacitor 115 and the capacitor 132X or 132Y. Therefore, it is desirable that the capacitors 132X and 132Y have the same electrostatic capacitance.

Figure 7A:
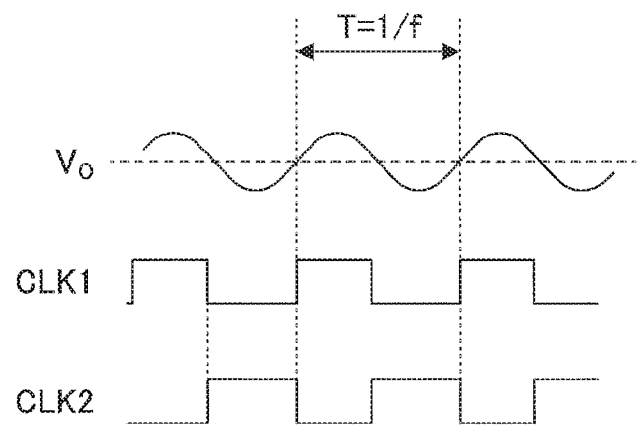
FIGS. 7A-7B are diagrams illustrating an AC voltage generated in a secondary-side resonance coil 110 and two clocks included in driving signals.
Figure 7B:
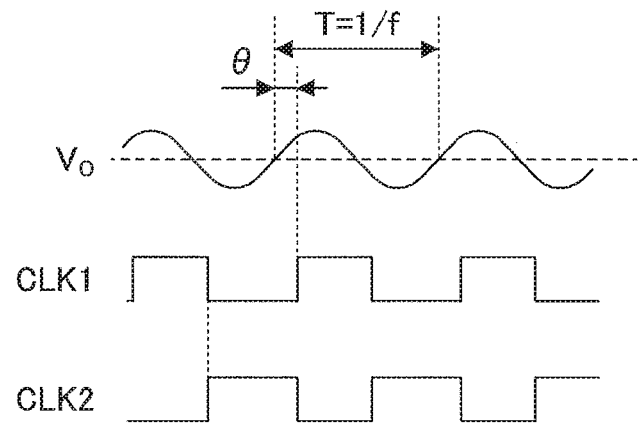

FIGS. 7A-7B are diagrams illustrating an AC voltage generated in the secondary-side resonance coil 110 and two clocks included in the driving signals.

An AC voltage $V_0$ illustrated in FIG. 7A and FIG. 7B is represented by a waveform having the same frequency as the power transmission frequency, which is an AC voltage generated, for example, in the secondary-side resonance coil 110, and detected by the voltmeter 116 (see FIG. 4). Also, the clocks CLK1 and CLK2 are two clocks included in the driving signals. For example, the clock CLK1 is used for driving the switch 131X, and the clock CLK2 is used for driving the switch 131Y. The clocks CLK1 and CLK2 are examples of a first signal and a second signal, respectively.

In FIG. 7A, the clocks CLK1 and CLK2 synchronize with the AC voltage $V_0$. In other words, the frequency of the clocks CLK1 and CLK2 is equivalent to the frequency of the AC voltage $V_0$, and the phase of the clock CLK1 is equivalent to the phase of the AC voltage $V_0$. Note that the clock CLK2 has a phase different from that of the clock CLK1 by 180 degrees, namely, the opposite phase.

In FIG. 7A, the cycle T of the AC voltage $V_0$ is the reciprocal of the frequency f, and the frequency f is 6.78 MHz here.

As in FIG. 7A, the clocks CLK1 and CLK2 synchronizing with the AC voltage $V_0$ may be generated by the controller 150 using the PLL 152 in a state where the switches 131X and 131Y are turned off, and further in a state where the power receiver 100 receives power from the power transmitter 10, and has a resonance current generated in the secondary-side resonance coil 110.

In FIG. 7B, the phase of the clocks CLK1 and CLK2 is behind the AC voltage $V_0$ by θ degree. Such clocks CLK1 and CLK2 having the phase difference of θ degree with respect to the AC voltage $V_0$ may be generated by the controller 150 using the phase shift circuit 153.

The controller 150 adjusts the phase difference of the two clocks CLK1 and CLK2 with respect to the AC voltage $V_0$, to detect a phase in which the maximum power reception efficiency is obtained. The phase in which the maximum power reception efficiency is obtained is a phase in which the power received by the power receiver 100 reaches the maximum, and the received power reaches the maximum if the resonance state continues over the entire period of one cycle because of the phase difference of the two clocks CLK1 and CLK2 with respect to the AC voltage $V_0$. Therefore, the controller 150 increases and decreases the phase difference of the two clocks CLK1 and CLK2 with respect to the AC voltage $V_0$ to detect the phase difference that makes the received power maximum, and treats the detected phase difference as 0 degrees.

Then, based on the phase difference that makes the received power the maximum (0 degrees) and data received from the power transmitter 10 representing the phase difference, the controller 150 sets the phase difference of the two clocks with respect to the AC voltage $V_0$ in the phase shift circuit 153.

Next, using FIG. 8, the power reception efficiency of the power receiver 100 will be described when receiving the power from the power transmitter 10 if the phase difference of the driving signal is adjusted.

Figure 8:
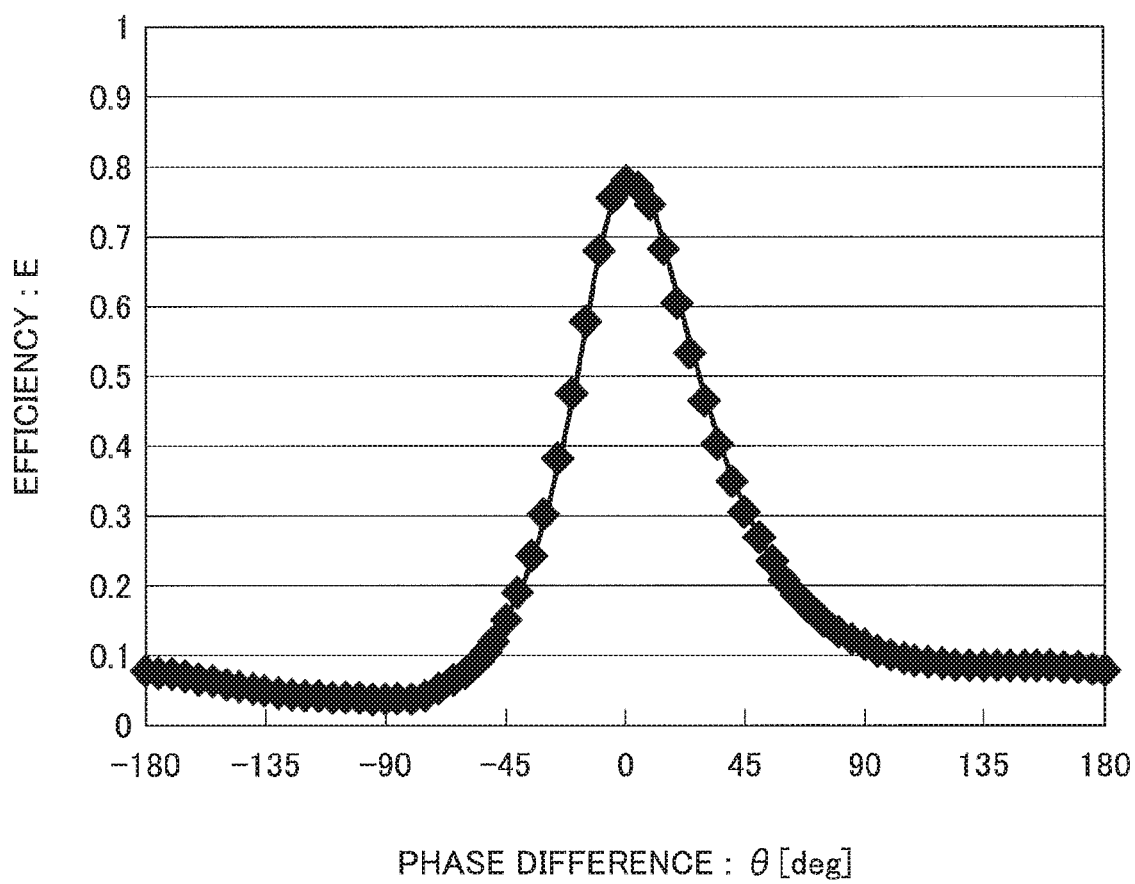
FIG. 8 is a diagram illustrating a simulation result representing a characteristic of the power reception efficiency with respect to the phase difference.

FIG. 8 is a diagram illustrating a simulation result representing a characteristic of the power reception efficiency with respect to phase difference. The phase difference on the horizontal axis represents the phase difference of the two clocks with respect to the AC voltage $V_0$ where 0 degrees is set as the phase difference making the received power maximum, and the power reception efficiency on the vertical axis represents the ratio of the power output by the power receiver 100 (Pout) to the power into the power transmitter 10 by the AC power supply 1 (Pin) (see FIG. 1). The power reception efficiency is equivalent to the transmission efficiency of the power between the power transmitter 10 and the power receiver 100.

Note that the frequency of the power transmitted by the power transmitter 10 is 6.78 MHz, and the frequency of the driving signal is set to the same. Also, the state where the phase difference is 0 degrees is a state where the resonance by magnetic resonance is generated in the secondary-side resonance coil 110 over the entire period of one cycle of the resonance current, and the resonance current is flowing in the secondary-side resonance coil 110. A greater phase difference means that the period during which the resonance is not generated in the secondary-side resonance coil 110 is longer in one cycle of the resonance current. Therefore, the state where the phase difference is 180 degrees is a state where the resonance current does not flow in the secondary-side resonance coil 110 at all, theoretically.

As illustrated in FIG. 8, if the phase difference is increased from 0 degrees, the power reception efficiency decreases. If the phase difference becomes about 60 degrees or greater, the power reception efficiency becomes about 0.1 or less. In this way, changing the phase difference of the two clocks with respect to the AC voltage $V_0$ changes the power of the resonance current flowing in the secondary-side resonance coil 110, and changes the power reception efficiency.

Figure 9:
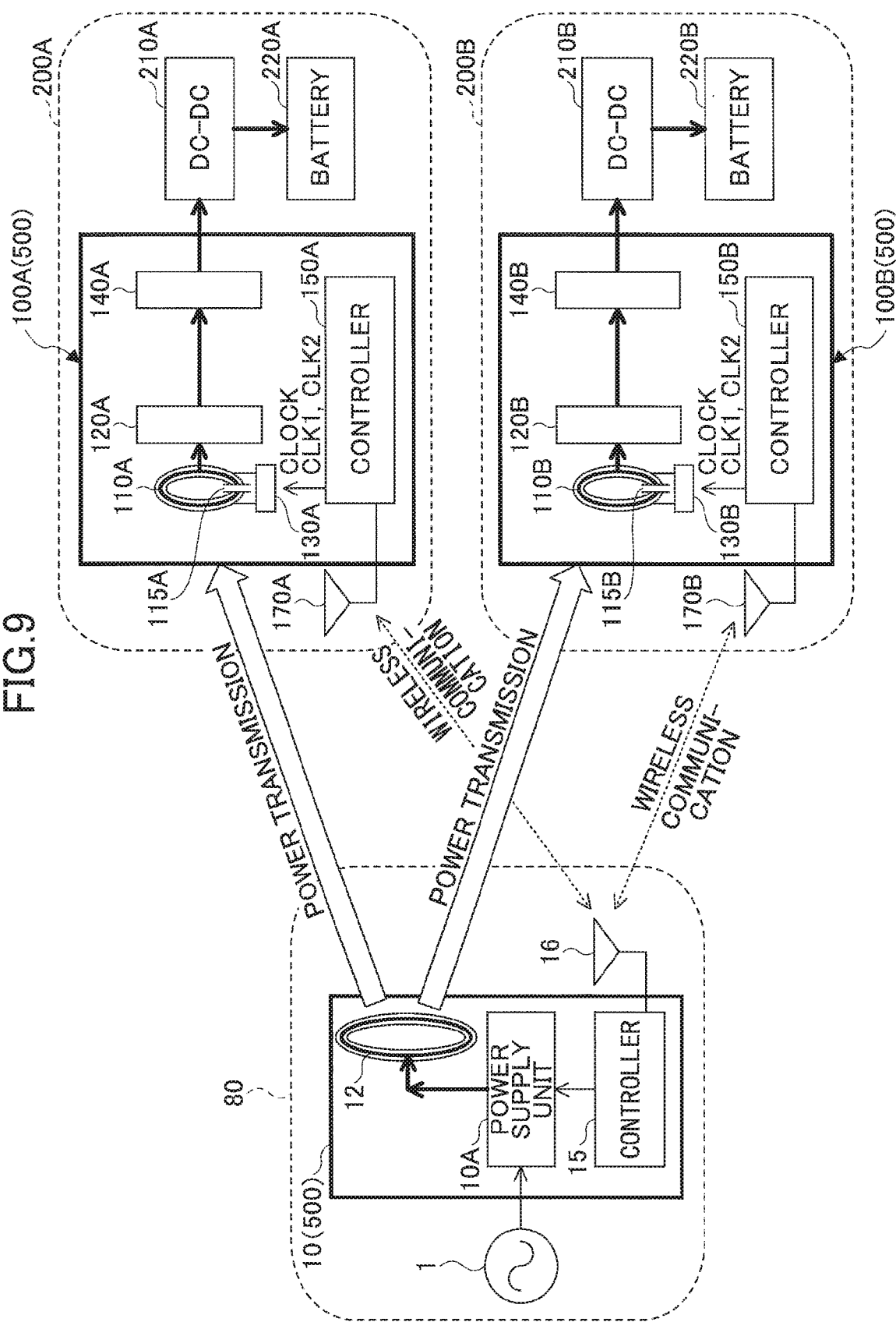
FIG. 9 is a diagram illustrating a power transmission apparatus 80 and electronic devices 200A and 200B using a power transmission system 500 according to the first embodiment.

FIG. 9 is a diagram illustrating a power transmission apparatus 80 using a power transmission system 500, and electronic devices 200A and 200B according to the first embodiment.

Although the power transmission apparatus 80 is the same as the power transmission apparatus 80 illustrated in FIG. 4, in FIG. 9, components other than the primary-side resonance coil 12, the control unit 15, and the antenna 16 in FIG. 4 are represented as a power supply unit 10A. The power supply unit 10A collectively represents the primary-side coil 11, the matching circuit 13, and the capacitor 14. Note that the AC power supply 1, the primary-side coil 11, the matching circuit 13, and the capacitor 14 may be collectively regarded as a power supply unit.

The antenna 16 just needs to be an antenna capable of wireless communication within a short distance that may be compliant with, for example, Bluetooth (registered trademark). The antenna 16 is provided to receive data representing the received power and the rated output from the power receivers 100A and 100B included in the electronic devices 200A and 200B, and the received data is input into the controller 15. The controller 15 is an example of a controller, and an example of a third communication unit.

The electronic devices 200A and 200B are, for example, terminals such as a tablet computer and a smart phone, respectively. The electronic devices 200A and 200B have the power receivers 100A and 100B, DC-DC converters 210A and 210B, and batteries 220A and 220B built in, respectively.

The power receivers 100A and 100B have the same configuration as that of the power receiver 100 illustrated in FIG. 4. Each of the DC-DC converters 210A and 210B is the same as the DC-DC converter 210 illustrated in FIG. 4. Also, each of the batteries 220A and 220B is the same as the battery 220 illustrated in FIG. 4.

The power receiver 100A has a secondary-side resonance coil 110A, a capacitor 115A, a rectification circuit 120A, an adjuster 130A, a smoothing capacitor 140A, a controller 150A, and an antenna 170A. The secondary-side resonance coil 110A is an example of a first secondary-side resonance coil.

The secondary-side resonance coil 110A, the capacitor 115A, the rectification circuit 120A, the adjuster 130A, the smoothing capacitor 140A, and the controller 150A correspond to the secondary-side resonance coil 110, the capacitor 115, the rectification circuit 120, the adjuster 130, the smoothing capacitor 140, and the controller 150 that are illustrated in FIG. 4, respectively. Note that in FIG. 9, the secondary-side resonance coil 110A, the rectification circuit 120A, and the smoothing capacitor 140A are illustrated in a simplified way, and the voltmeter 155 and the output terminals 160X and 160Y are omitted.

The power receiver 100B has the secondary-side resonance coil 110B, the capacitor 115B, the rectification circuit 120B, the adjuster 130B, the smoothing capacitor 140B, the controller 150B, and the antenna 170B. The power receiver 100B is an example of other power receivers, viewed from the power receiver 100A. Also, the secondary-side resonance coil 110B is an example of a second secondary-side resonance coil.

The secondary-side resonance coil 110B, the capacitor 115B, the rectification circuit 120B, the adjuster 130B, the smoothing capacitor 140B, and the controller 150B, respectively, correspond to the secondary-side resonance coil 110, the capacitor 115, the rectification circuit 120, the adjuster 130, the smoothing capacitor 140, and the controller 150 which are illustrated in FIG. 4. Note that in FIG. 9, the secondary-side resonance coil 110B, the rectification circuit 120B, and the smoothing capacitor 140B are illustrated in a simplified way, and the voltmeter 155 and the output terminals 160X and 160Y are omitted.

The antennas 170A and 170B just need to be antennas capable of wireless communication within a short distance that may be compliant with, for example, Bluetooth (registered trademark). The antennas 170A and 170B are provided to execute data communication with the antenna 16 of the power transmitter 10, and connected to the controllers 150A and 150B of the power receivers 100A and 100B, respectively. The controllers 150A and 150B are examples of a drive controller, and examples of a first communication unit and a second communication unit, respectively.

The controller 150A of the power receiver 100A transmits data representing the received power of the secondary-side resonance coil 110A and the rated output of the battery 220A to the power transmitter 10 via the antenna 170A. Similarly, the controller 150B of the power receiver 100B transmits the data representing the received power of the secondary-side resonance coil 110B and the rated output of the battery 220B to the power transmitter 10 via the antenna 170B.

The electronic devices 200A and 200B can charge the batteries 220A and 220B, respectively, in a state placed close to the power transmission apparatus 80 without contacting the power transmission apparatus 80. It is possible to charge the batteries 220A and 220B at the same time.

Among the components illustrated in FIG. 9, the power transmission system 500 is constituted with the power transmitter 10 and the power receivers 100A and 100B. In other words, the power transmission apparatus 80 and the electronic devices 200A and 200B adopt the power transmission system 500 that makes it possible to execute power transmission in a contactless state by magnetic resonance.

Here, if charging the batteries 220A and 220B at the same time, as described with using FIG. 2 and FIG. 3, a state may be generated in which the balance of power supply to the electronic devices 200A and 200B is not good.

Thereupon, to improve the balance of power supply, the power transmitter 10 sets the phase differences of the driving signals (clocks CLK1 and CLK2) that drive the adjusters 130A and 130B with respect to the AC voltage $V_O$, based on the power reception efficiency of the secondary-side resonance coil 110A, the rated output of the battery 220A, the power reception efficiency of the secondary-side resonance coil 110B, and the rated output of the battery 220B.

Figure 10:
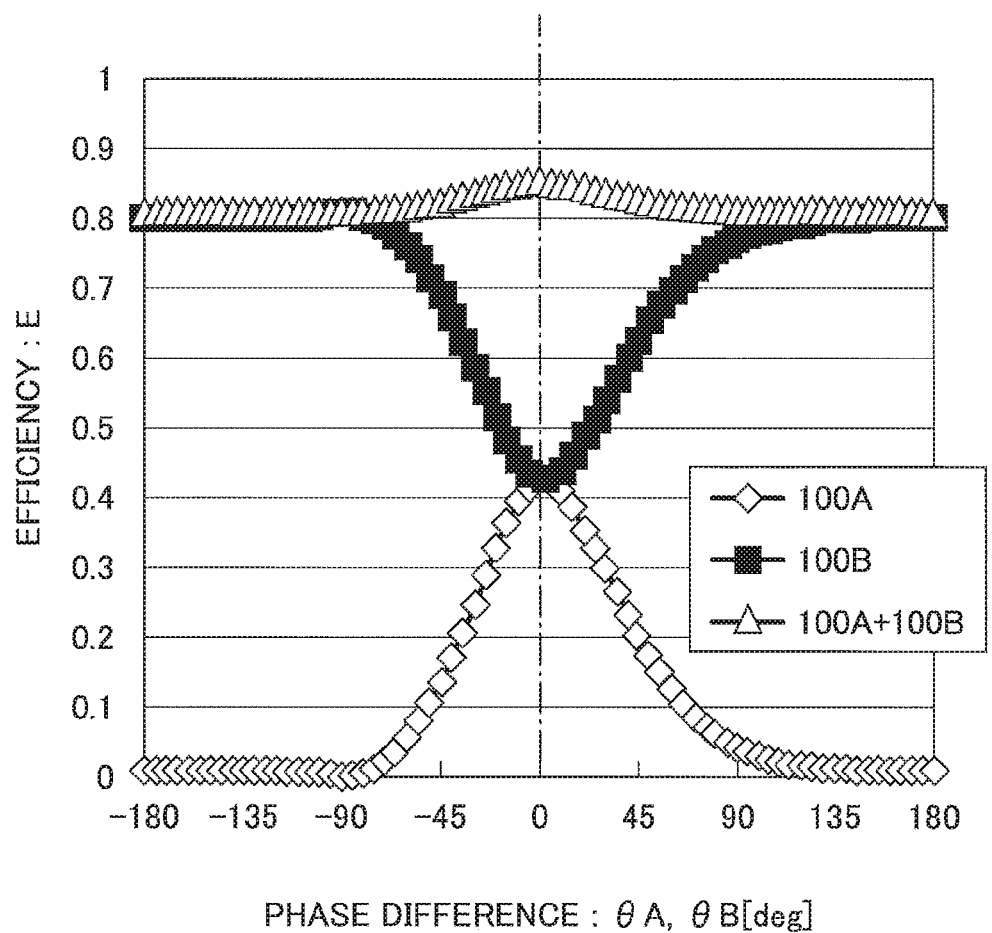
FIG. 10 is a diagram illustrating a relationship between the phase differences of driving signals and the received power of power receivers 100A and 100B.

FIG. 10 is a diagram illustrating a relationship between the phase differences of the driving signals and the power reception efficiencies of the power receivers 100A and 100B.

A case will be described here where the phase difference of the driving signal driving the adjuster 130A of the power receiver 100A is changed from the phase difference (0 degrees) in which the power reception efficiency reaches the maximum, in a state where the phase difference of the driving signal driving the adjuster 130B of the power receiver 100B is fixed to the phase difference (0 degrees) in which the power reception efficiency reaches the maximum.

In FIG. 10, the horizontal axis represents the phase differences (θA, θB) of the driving signals driving the adjusters 130A and 130B of the power receivers 100A and 100B. Also, the vertical axis on the left represents each of the power reception efficiency of the power receivers 100A and 100B, and the total value of the power reception efficiency of the power receivers 100A and 100B.

In a state where the phase difference of the driving signal driving the adjuster 130B of the power receiver 100B is fixed to 0 degrees, if the phase difference of the driving signal driving the adjuster 130A of the power receiver 100A is increased or decreased from 0 degrees, as illustrated in FIG. 10, the ratio of the power reception efficiency of the power receiver 100A decreases. The power reception efficiency of the power receiver 100A reaches the maximum when the phase difference is 0 degrees. Also, the ratio of the power reception efficiency of the power receiver 100A increases while the power reception efficiency of the power receiver 100B decreases.

In this way, if the phase difference of the driving signal driving the adjuster 130A of the power receiver 100A is changed, the power to be received by the power receiver 100A decreases, and the current flowing in the power receiver 100A also decreases. In other words, changing the phase difference changes the impedance of the power receiver 100A.

In the simultaneous power transmission using magnetic resonance, the power transmitted from the power transmitter 10 to the power receivers 100A and 100B by magnetic resonance is distributed between the power receivers 100A and 100B. Therefore, if the phase difference of the driving signal driving the adjuster 130A of the power receiver 100A is changed from 0 degrees, the power to be received by the power receiver 100B increases by the decreased amount of the power to be received by the power receiver 100A.

Therefore, as illustrated in FIG. 10, the ratio of the power reception efficiency of the power receiver 100A decreases. This also increases the ratio of the power reception efficiency of the power receiver 100B.

If the phase difference of the driving signal driving the adjuster 130A of the power receiver 100A changes to about ±90 degrees, the ratio of the power reception efficiency of the power receiver 100A decreases to nearly 0, and the ratio of the power reception efficiency of the power receiver 100B increases to about 0.8.

Then, the sum of the power reception efficiency of the power receivers 100A and 100B is about 0.85 if the phase difference of the driving signal driving the adjuster 130A of the power receiver 100A is 0 degrees. If the phase difference of the driving signal driving the adjuster 130A of the power receiver 100B decreases to about ±90 degrees, the sum of the power reception efficiency of the power receivers 100A and 100B becomes about 0.8.

In this way, in a state where the phase difference of the driving signal driving the adjuster 130B of the power receiver 100B is fixed to 0 degrees, if the phase difference of the driving signal driving the adjuster 130A of the power receiver 100A is changed from 0 degrees, the ratio of the power reception efficiency of the power receiver 100A decreases, and the ratio of the power reception efficiency of the power receiver 100B increases. Also, the sum of the power reception efficiency of the power receivers 100A and 100B does not change appreciably from a value around 0.8.

In the power transmission using magnetic resonance, the power transmitted from the power transmitter 10 to the power receivers 100A and 100B by magnetic resonance is distributed between the power receivers 100A and 100B. Therefore, even if the phase difference changes, the sum of the power reception efficiency of the power receivers 100A and 100B does not change appreciably.

Similarly, in a state where the phase difference of the driving signal driving the adjuster 130A of the power receiver 100A is fixed to 0 degrees, if the phase difference of the driving signal driving the adjuster 130B of the power receiver 100B is decreased from 0 degrees, the ratio of the power reception efficiency of the power receiver 100B decreases, and the ratio of the power reception efficiency of the power receiver 100A increases. Also, the sum of the power reception efficiency of the power receivers 100A and 100B does not change appreciably from a value around 0.8.

Therefore, if the phase difference is adjusted for either of the driving signal driving the adjuster 130A or 130B of the power receiver 100A or 100B, the ratio of the power reception efficiency of the power receivers 100A and 100B can be adjusted.

As described above, if the phase difference of the driving signal driving the adjuster 130A or 130B is changed, the ratio of the power reception efficiency of the secondary-side resonance coils 110A and 110B of the power receivers 100A and 100B changes.

Therefore, in the first embodiment, either of the driving signal driving the adjuster 130A or 130B of the power receiver 100A or 100B is changed from a reference phase difference. The reference phase difference is defined, for example, as the phase difference in which the power reception efficiency reaches the maximum (0 degrees), and in this case, the phase difference of the other is changed from 0 degrees.

In this case, which one of the phase differences of the driving signals of the adjusters 130A and 130B is changed from the reference phase difference is determined as follows.

First, the determination starts with calculating a first value obtained by dividing the rated output of the battery 220A by the power reception efficiency of the secondary-side resonance coil 110A, and a second value obtained by dividing the rated output of the battery 220B by the power reception efficiency of the secondary-side resonance coil 110B.

Then, the phase difference of the driving signal corresponding to the power receiver 100A or 100B having the smaller value among the first value and the second value is changed from 0 degrees, to set an appropriate phase difference.

The value obtained by dividing the rated output by the power reception efficiency represents the power transmitted by the power transmitter 10 to the power receiver 100A or 100B (required power to be transmitted). The required power to be transmitted is power transmitted by the power transmitter 10 so that the power receiver 100A or 100B receives the power without power surplus and power shortage.

Therefore, if the power supply is reduced for the power receiver 100A or 100B having the smaller required power to be transmitted, the power supply can be increased for the power receiver 100A or 100B having the greater required power to be transmitted. Consequently, the balance of power supply to the power receivers 100A and 100B can be improved.

As can be seen in FIG. 10, if the phase difference of one of the power receivers 100A and 100B is changed, the received power decreases in the one of the power receivers 100A and 100B accordingly. Also, the received power increases in the other power receiver 100A or 100B in a state where the phase difference is fixed to 0 degrees.

Therefore, if the phase difference of the driving signal corresponding to the power receiver 100A or 100B having the smaller required power to be transmitted is changed from the reference phase difference (0 degrees), the power supply to the power receiver 100A or 100B having the smaller required power to be transmitted is decreased, and the power supply to the power receiver 100A or 100B having the greater required power to be transmitted can be increased.

In this way, it is possible to improve the balance of power supply to the power receivers 100A and 100B. Note that a specific method of setting the phase difference will be described later.

Next, using FIG. 11, a method will be described by which the power transmitter 10 obtains data representing the power reception efficiency and the rated output from the power receivers 100A and 100B.

Figure 11:
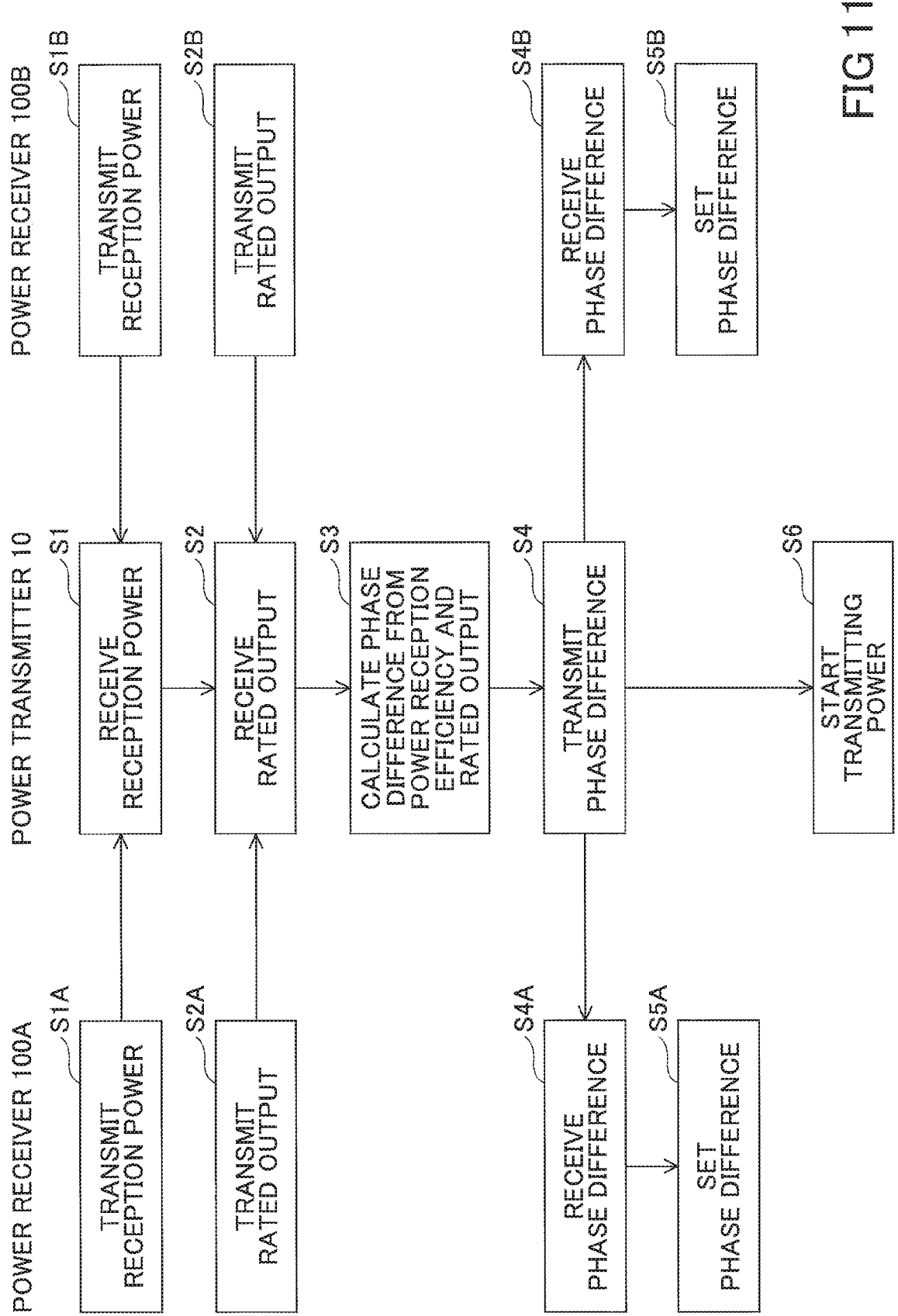
FIG. 11 is a task diagram illustrating a process executed by a power transmitter 10 and power receivers 100A and 100B to set the phase differences.

FIG. 11 is a task diagram illustrating a process executed by the power transmitter 10 and the power receivers 100A and 100B to set the phase differences. This task is executed by the controllers 15, 150A, and 150B (see FIG. 9).

First, the power receiver 100A transmits data representing the received power to the power transmitter 10 (Step S1A). Similarly, the power receiver 100B transmits data representing the received power to the power transmitter 10 (Step S1B). Accordingly, the power transmitter 10 receives the data representing the received power from the power receivers 100A and 100B (Step S1).

Transmission of the data representing the received power may be executed by the controllers 150A and 150B via the antennas 170A and 170B, respectively, for example, in response to a request from the power transmitter 10. Also, the data representing the received power may include an identifier to identify the power receiver 100A or 100B.

The data representing the received power may be obtained as follows. First, the power transmitter 10 wirelessly transmits a signal to turn on both the switches (131X and 131Y of FIG. 4) of the adjuster 130B, and the power transmitter 10 wirelessly transmits a signal to turn off both the switches of the adjuster 130A.

Here, having both the switches of the adjuster 130B turned on, the resonance stops occurring in the adjuster 130B, and the power receiver 100B transitions to a state of not receiving the power. In other words, the power receiver 100B is turned off. Also, having both the switches of the adjuster 130A turned off, it transitions to a state where the resonance current flows in the secondary-side resonance coil 110A.

Then, the power transmitter 10 transmits predetermined power to the power receiver 100A by magnetic resonance, and the power receiver 100A receives the power. At this time, if the power receiver 100A transmits a signal representing the received power to the power transmitter 10, the power transmitter 10 can measure the power reception efficiency of the power receiver 100A.

Also, to measure the power reception efficiency of the power receiver 100B, the power transmitter 10 wirelessly transmits a signal to turn on both the switches of the adjuster 130A, and the power transmitter 10 wirelessly transmits a signal to turn off both the switches of the adjuster 130B. Then, the power transmitter 10 transmits predetermined power to the power receiver 100B by magnetic resonance, the power receiver 100B transmits a signal representing the received power to the power transmitter 10, and consequently, the power transmitter 10 can measure the power reception efficiency of the power receiver 100B.

Next, the power receiver 100A transmits data representing the rated output to the power transmitter 10 (Step S2A). Similarly, the power receiver 100B transmits data representing the rated output to the power transmitter 10 (Step S2B). Accordingly, the power transmitter 10 receives the data representing the rated output from the power receivers 100A and 100B (Step S2).

The data representing the rated output of the electronic devices 200A and 200B may be stored, for example, in the internal memory of the controllers 150A and 150B in advance so that the controllers 150A and 150B can transmit the data to the power transmitter 10 via the antennas 170A and 170B after having sent the data representing the power reception efficiency.

Next, based on the data representing the power reception efficiency and the data representing the rated output of the power receiver 100A, and the data representing the power reception efficiency and the data representing the rated output of the power receiver 100B, the power transmitter 10 calculates the phase differences of the driving signals corresponding to the power receivers 100A and 100B (Step S3). One of the phase differences is the reference phase difference (0 degrees) in which the power reception efficiency reaches the maximum, and the other phase difference is the phase difference changed from the reference phase difference (0 degrees) to be optimized. Step S3 will be described in detail later using FIG. 15.

Next, the power transmitter 10 transmits the data representing the phase differences to the power receivers 100A and 100B, respectively (Step S4). Then, the power receivers 100A and 100B receive the respective phase differences, respectively (Step S4A and S4B).

Here, the controller 15 of the power transmitter 10 has been set to transmit the data representing the phase differences to the power receivers 100A and 100B via the antenna 16 after calculating the phase differences.

The controllers 150A and 150B of the power receivers 100A and 100B set the phase differences in the driving signals, respectively (Step S5A and S5B).

The power transmitter 10 starts transmitting power (Step S6). Step S6 may be executed, for example, when indications representing that the controllers 150A and 150B have completed setting the phase differences in the driving signals, respectively, have come to the power transmitter 10.

Here, using FIG. 12 and FIG. 13, a method for obtaining the data representing the power reception efficiencies of the power receivers 100A and 100B will be described.

Figure 12:
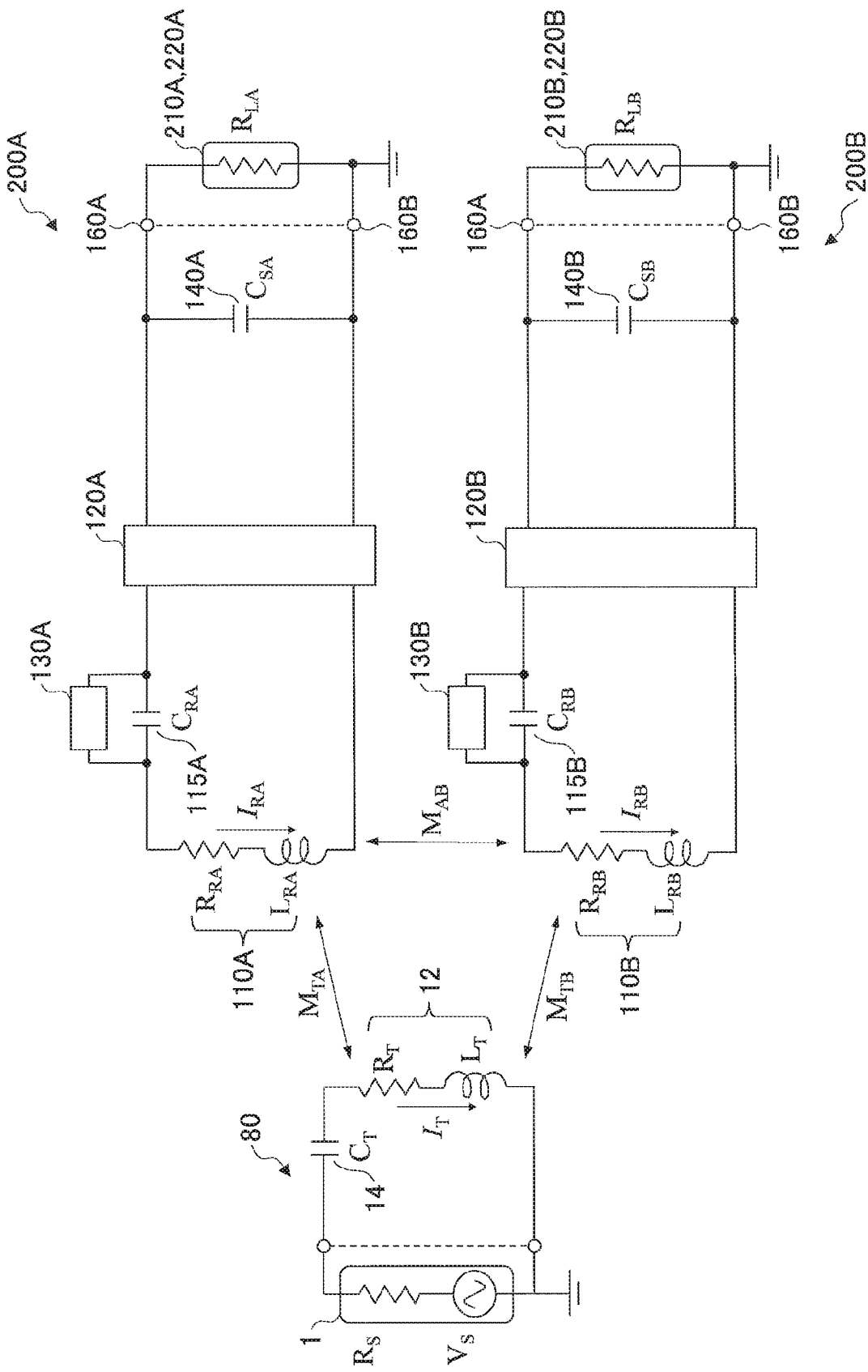
FIG. 12 is a diagram illustrating an equivalent circuit of a power transmission apparatus 80 and electronic devices 200A and 200B.

FIG. 12 is a diagram illustrating an equivalent circuit of the power transmission apparatus 80 and the electronic devices 200A and 200B. The equivalent circuit illustrated in FIG. 12 corresponds to the power transmission apparatus 80 and the electronic devices 200A and 200B illustrated in FIG. 9. However, description here will assume that the power transmission apparatus 80 does not include the primary-side coil 11, and the primary-side resonance coil 12 is directly connected to the AC power supply 1. Also, the power receivers 100A and 100B include the voltmeters 155A and 155B, respectively.

In FIG. 12, the secondary-side resonance coil 110A corresponds to a coil $L_{RA}$ and a resistor $R_{RA}$, and the capacitor 115A corresponds to a capacitor $C_{RA}$. Also, the smoothing capacitor 140A corresponds to a capacitor $C_{SA}$, and the DC-DC converter 210A and the battery 220A correspond to a resistor $R_{LA}$.

Similarly, the secondary-side resonance coil 110B corresponds to a coil $L_{RB}$ and a resistor $R_{RB}$, and the capacitor 115B corresponds to a capacitor $C_{RB}$. Also, the smoothing capacitor 140B corresponds to a capacitor $C_{SB}$, and the DC-DC converter 210B and the battery 220B correspond to resistors $R_{LB}$.

Also, the resonance coil 12 of the power transmission apparatus 80 corresponds to a resistor $R_T$ and a coil $L_T$, and the AC power supply 1 corresponds to a power supply $V_S$ and a resistor $R_S$. Also, the capacitor 14 corresponds to a capacitor $C_T$.

Further, $M_{TA}$ represents the mutual inductance between the power transmission apparatus 80 and the electronic device 200A, $M_{TB}$ represents the mutual inductance between the power transmission apparatus 80 and the electronic device 200B, and $M_{AB}$ represents the mutual inductance between the electronic devices 200A and 200B.

Here, comparing the mutual inductance $M_{AB}$ with the mutual inductance $M_{TA}$ and the mutual inductance $M_{TB}$, the mutual inductance MAB is small enough to be negligible. Therefore, the mutual inductance $M_{TA}$ and the mutual inductance $M_{TB}$ will be considered here.

The mutual inductance $M_{TA}$ is determined by the power reception efficiency of the power receiver 100A of the electronic device 200A with respect to the power transmission apparatus 80. This is because the power reception efficiency is determined by the position (distance) and orientation (angle) of the power receiver 100A with respect to the power transmission apparatus 80. Similarly, the mutual inductance $M_{TB}$ is determined by the power reception efficiency of the power receiver 100B of the electronic device 200B with respect to the power transmission apparatus 80.

The power reception efficiency of the power receiver 100A can be obtained by measuring the power received by the power receiver 100A when the power transmitter 10 transmits the power to the power receiver 100A in a state where the power receiver 100B is turned off. Similarly, the power reception efficiency of the power receiver 100B can be obtained by measuring the power received by the power receiver 100B when the power transmitter 10 transmits the power to the power receiver 100B in a state where the power receiver 100A is turned off.

In this way, once each of the power reception efficiencies of the power receivers 100A and 100B has been obtained independently, it is possible to obtain the mutual inductance $M_{TA}$ and the mutual inductance $M_{TB}$.

In the first embodiment, to change the ratio of the power reception efficiency of the secondary-side resonance coils 110A and 110B of the power receivers 100A and 100B, the phase difference of the driving signal driving the adjuster 130A or 130B is changed.

Therefore, table data is provided in advance in which the phase difference is associated with the relationship between the mutual inductance $M_{TA}$ and the mutual inductance $M_{TB}$, to adjust the phase difference of the driving signal using such table data.

FIGS. 13A-13B are diagrams illustrating table data in which the phase difference is associated with the relationship between the mutual inductance $M_{TA}$ and the mutual inductance $M_{TB}$.

FIG. 13A illustrates table data for adjusting the phase difference of the driving signal driving the adjuster 130A in a state where the phase difference of the driving signal driving the adjuster 130B is fixed to 0 degrees.

Mutual inductances $M_{TA1}$, $M_{TA2}$, $M_{TA3}$, and so on in practice take specific values of the mutual inductance $M_{TA}$, respectively. Similarly, mutual inductances $M_{TB1}$, $M_{TB2}$, $M_{TB3}$, and so on take specific values of the mutual inductance $M_{TB}$, respectively. Phase differences PD1A, PD2A, PD3A, and so on, and PD11A, PD12A, PD13A, and so on take specific values of the phase difference obtained by simulation or experimentally.

FIG. 13B illustrates table data for adjusting the phase difference of the driving signal driving the adjuster 130B in a state where the phase difference of the driving signal driving the adjuster 130A is fixed to 0 degrees.

Mutual inductances $M_{TA1}$, $M_{TA2}$, $M_{TA3}$, and so on, and mutual inductances $M_{TB1}$, $M_{TB2}$, $M_{TB3}$, and so on are the same as those in FIG. 13A. Phase differences PD1B, PD2B, PD3B, and so on, and PD11B, PD12B, PD13B, and so on take specific values of the phase difference obtained by simulation or experimentally.

The table data illustrated in FIG. 13A and FIG. 13B can be experimentally obtained by measuring the mutual inductances $M_{TA}$ and $M_{TB}$ in a state where the positions and orientations of the power receivers 100A and 100B are changed variously with respect to the power transmitter 10, and optimizing the phase differences.

FIGS. 14A-14B illustrate table data in which the mutual inductances $M_{TA}$ and $M_{TB}$ are associated with the power reception efficiency, respectively. FIG. 14A illustrates table data in which the mutual inductance $M_{TA}$ is associated with the power reception efficiency of the power receiver 100A, and FIG. 14B illustrates table data in which the mutual inductance $M_{TB}$ is associated with the power reception efficiency of the power receiver 100B.

The mutual inductances $M_{TA}$ and $M_{TB}$ are determined by the power reception efficiency $E_A$ and $E_B$ of the power receivers 100A and 100B with respect to the power transmission apparatus 80, respectively.

In FIG. 14A, mutual inductances $M_{TA1}$, $M_{TA2}$, and so on are associated with the power reception efficiency $E_{A1}$, $E_{A2}$, and so on of the power receiver 100A. Also, in FIG. 14B, mutual inductances $M_{TB1}$, $M_{TB2}$, and so on are associated with power reception efficiency $E_{B1}$, $E_{B2}$, and so on of the power receiver 100B.

If the mutual inductances $M_{TA}$ and $M_{TB}$ and the power reception efficiency of the power receivers 100A and 100B are measured in advance by experiment or the like to generate table data as illustrated in FIG. 14A and FIG. 14B, it is possible to obtain the mutual inductances $M_{TA}$ and $M_{TB}$ of the power receivers 100A and 100B from the power reception efficiency of the power receivers 100A and 100B. Alternatively, simulation may be used for obtaining the mutual inductances $M_{TA}$ and $M_{TB}$ of the power receivers 100A and 100B from the power reception efficiency of the power receivers 100A and 100B.

Next, using FIG. 15, a method for setting the phase difference will be described.

Figure 15:
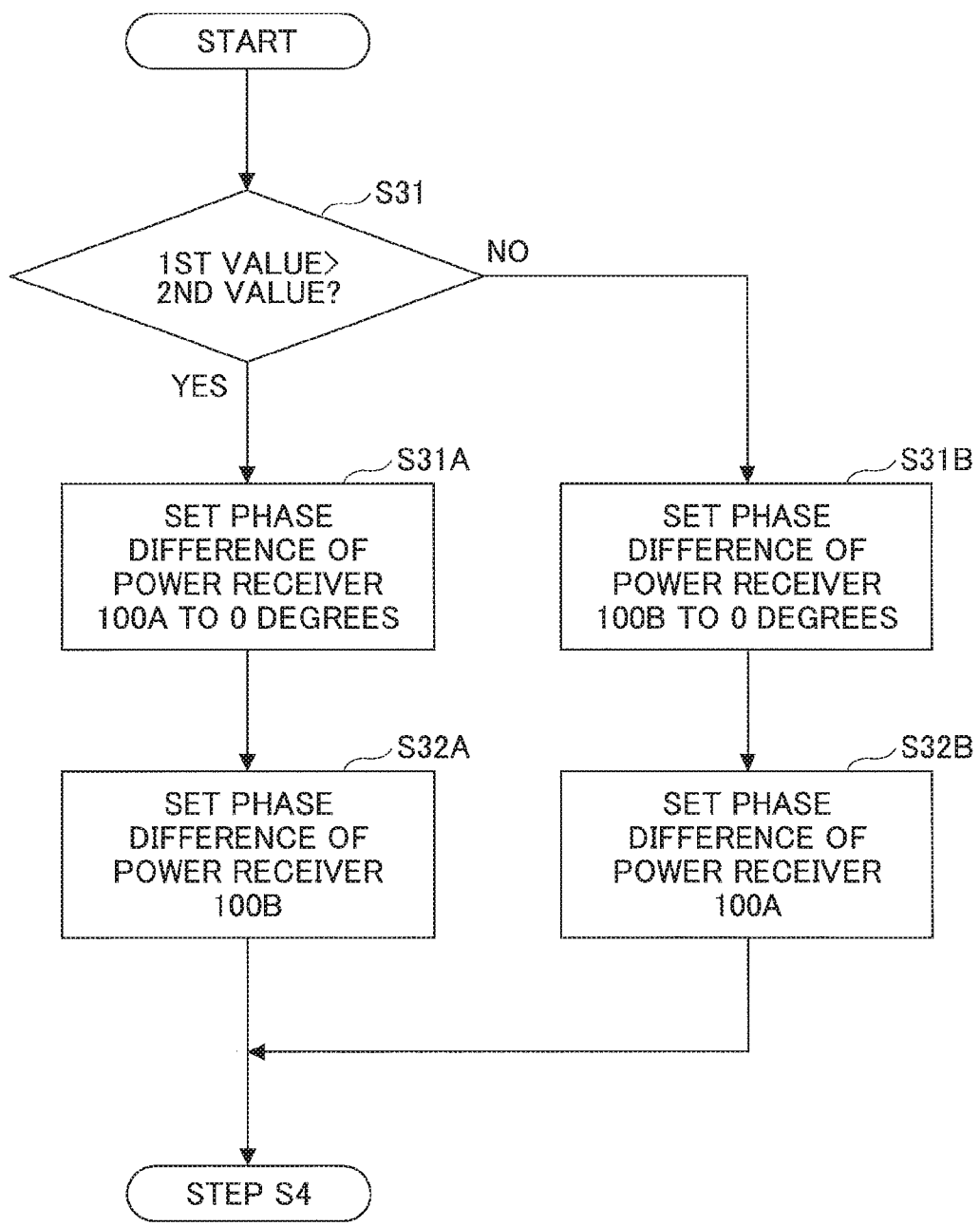
FIG. 15 is a flowchart illustrating a method executed by a power transmitter 10 to set the phase difference of a power receiver 100A or 100B according to the first embodiment.

FIG. 15 is a flowchart illustrating a method executed by the power transmitter 10 to set the phase difference of the power receiver 100A or 100B according to the first embodiment. This flow represents a process executed by the controller 15 of the power transmitter 10, to illustrate in detail the process content at Step S3 in FIG. 11.

The controller 15 having received the signal representing the received power from the power receivers 100A and 100B to obtain the power reception efficiency, and having received the signal representing the rated output from the power receivers 100A and 100B, proceeds to Step S3 and starts the process illustrated in FIG. 15.

The controller 15 calculates a first value obtained by dividing the rated output of the battery 220A by the power reception efficiency of the secondary-side resonance coil 110A, and a second value obtained by dividing the rated output of the battery 220B by the power reception efficiency of the secondary-side resonance coil 110B, and determines whether the first value is greater than the second value (Step S31).

If having determined that the first value is greater than the second value (YES at Step S31), the controller 15 sets the phase difference of the driving signal driving the adjuster 130A of the power receiver 100A to 0 degrees (Step S31A).

Next, the controller 15 sets the phase difference of the driving signal driving the adjuster 130B of the power receiver 100B (Step S32A). Specifically, based on the table data illustrated in FIGS. 14A and 14B, the controller 15 obtains the mutual inductances $M_{TA}$ and $M_{TB}$ of the power receivers 100A and 100B from the power reception efficiency $E_A$ and $E_B$ of the power receivers 100A and 100B, respectively. Then, the controller 15 refers to the table data illustrated in FIG. 13B, and based on the mutual inductances $M_{TA}$ and $M_{TB}$ of the power receivers 100A and 100B, obtains the phase difference of the driving signal driving the adjuster 130B of the power receiver 100B.

After having completed Step S32A, the controller 15 proceeds to Step S4 in the flow (see FIG. 11).

On the other hand, if having determined that the first value is less than or equal to the second value (NO at Step S31), the controller 15 sets the phase difference of the driving signal driving the adjuster 130B of the power receiver 100B to 0 degrees (Step S31B).

Next, the controller 15 sets the phase difference of the driving signal driving the adjuster 130B of the power receiver 100A (Step S32B). Specifically, based on the table data illustrated in FIGS. 14A and 14B, the controller 15 obtains the mutual inductances $M_{TA}$ and $M_{TB}$ of the power receivers 100A and 100B from the power reception efficiency EA and EB of the power receivers 100A and 100B, respectively. Then, the controller 15 refers to the table data illustrated in FIG. 13A, and based on the mutual inductances $M_{TA}$ and $M_{TB}$ of the power receivers 100A and 100B, obtains the phase difference of the driving signal driving the adjuster 130A of the power receiver 100A.

After having completed Step S32B, the controller 15 proceeds to Step S4 in the flow (see FIG. 11).

As described above, the controller 15 sets the phase difference of the driving signal driving the adjuster 130A or 130B of the power receiver 100A or 100B.

Thus, according to the first embodiment, the required power to be transmitted to the power receivers 100A and 100B is obtained based on the power reception efficiency of the secondary-side resonance coils 110A and 110B of the power receivers 100A and 100B, and the rated output of the electronic devices 200A and 200B.

Then, the phase difference of the driving signal corresponding to the power receiver 100A or 100B having the smaller required power to be transmitted among the power receivers 100A and 100B is changed from the reference phase difference.

Consequently, the power supply to the power receiver 100A or 100B having the smaller required power to be transmitted is decreased, and the power supply to the power receiver 100A or 100B having the greater required power to be transmitted can be increased.

In this way, it is possible to improve the balance of power supply to the power receivers 100A and 100B.

Therefore, according to the first embodiment, it is possible to provide the power receivers 100A and 100B with which the balance of power supply can be improved. Also, according to the first embodiment, it is possible to provide the power transmission system 500 that can improve the balance of power supply.

Also, so far, the embodiment has been described in which among the two power receivers 100A and 100B, the phase difference of the driving signal corresponding to the power receiver having the smaller required power to be transmitted (100A or 100B) is decreased to improve the balance of power supply to the power receivers 100A and 100B.

However, there may be cases where three or more power receivers are charged at the same time. In such a case, the phase differences of the driving signals may be reduced for the power receivers other than the power receiver whose required power is the largest, in other words, the largest power value obtained by dividing the rated power by the power reception efficiency.

Also, so far, the embodiment has been described in which the electronic devices 200A and 200B are, for example, terminals such as a tablet computer and a smartphone. However, the electronic devices 200A and 200B may be any electronic devices that have rechargeable batteries built in, for example, note-type PCs (Personal Computers), cellular phone terminals, portable gaming machines, digital cameras, and video cameras.

Also, so far, the embodiment has been described in which the phase difference is obtained depending on the power reception efficiency and rated output of the two power receivers 100A and 100B, and the controller 150A or 150B adjusts the phase difference of the driving signal driving the switches 131A and 131B.

However, if the power is transmitted between a single power transmitter 10 and a single power receiver 100 (see FIG. 4), the controller 150 of the power receiver 100 may drive the switches 131A and 131B using the phase difference that has been obtained in advance by experiment or the like. In this case, it is not necessary to store the data representing the rated output of the battery 220 in the internal memory of the controller 150.

Also, if the power is transmitted between a single power transmitter 10 and a single power receiver 100 (see FIG. 4), it is possible to adjust the received power by having the controller 150 of the power receiver 100 adjust the phase difference of the clocks CLK1 and CLK2. In this case, it is not necessary to detect the phase difference that maximizes the power received by the power receiver 100.

Also, so far, the embodiment has been described in which the power receivers 100A and 100B charge the batteries 220A and 220B at the same time. However, the electronic devices 200A and 200B are not required to include the batteries 220A and 220B, and may directly consume power received by the power receivers 100A and 100B, respectively, to operate. Since the power receivers 100A and 100B can receive power efficiently at the same time, even if the electronic devices 200A and 200B do not include the batteries 220A and 220B, respectively, it is possible to drive the electronic devices 200A and 200B at the same time. This is impossible if receiving the power in a time sharing manner, and hence, this is one of the advantages of receiving the power at the same time. Note that in such a case, the phase differences may be set by using the rated output required for driving the electronic devices 200A and 200B.

Also, so far, the embodiment has been described in which the controller 15 of the power transmitter 10 generates the driving signals to be transmitted to the power receivers 100A and 100B. However, just the data representing transmission power of the power transmitter 10 may be transmitted to the power receivers 100A and 100B, to have the power receivers 100A and 100B generate the driving signals, respectively. In this case, the power receivers 100A and 100B may execute data communication with each other to determine which of the power receivers 100A and 100B has greater power to be received so that at least one of the power receivers 100A and 100B generates the driving signal to increase the phase difference of the driving signal of the power receiver 100A or 100B having the smaller power to be received.

Alternatively, the power transmitter 10 may receive the data representing the received power and the rated output from the power receivers 100A and 100B, to make the controller 150A or 150B of the power receiver 100A or 100B having the smaller required power to be transmitted adjust the phase difference. In this case, the controller 150A or 150B may store the data required for adjusting the phase difference in the internal memory.

Figure 16:
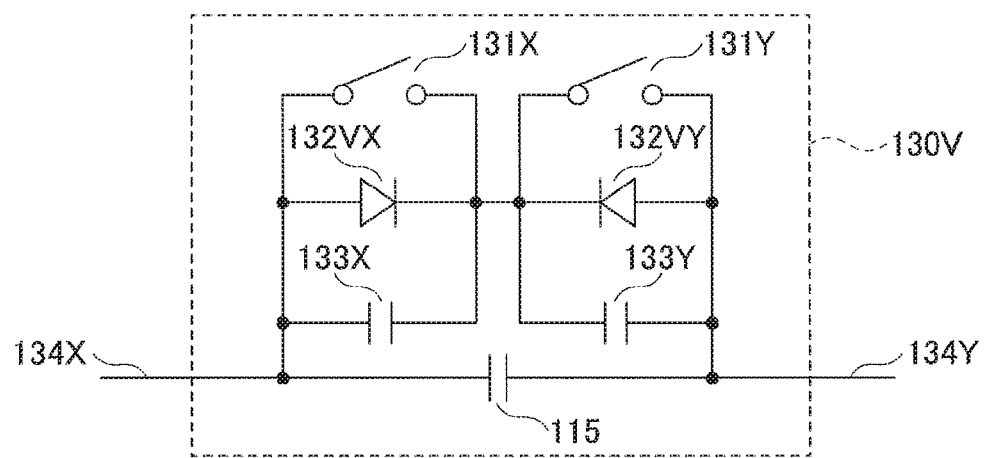
FIG. 16 is a diagram illustrating an adjuster 130V in a modified example of the first embodiment.

Also, the directions of the diodes 131X and 131Y of the adjuster 130 may be opposite to the directions illustrated in FIG. 4. FIG. 16 is a diagram illustrating an adjuster 130V in a modified example of the first embodiment.

The adjuster 130V has switches 131X and 131Y, diodes 132VX and 132VY, capacitors 133X and 133Y, and terminals 134X and 134Y. The rectification directions of the diode 132VX and 132VY are opposite to those of the diodes 132X and 132Y illustrated in FIG. 4, respectively. Other than this, the adjuster 130V is the same as the adjuster 130 illustrated in FIG. 4. Therefore, the same codes are assigned to the same components, and their description is omitted.

Figure 17:
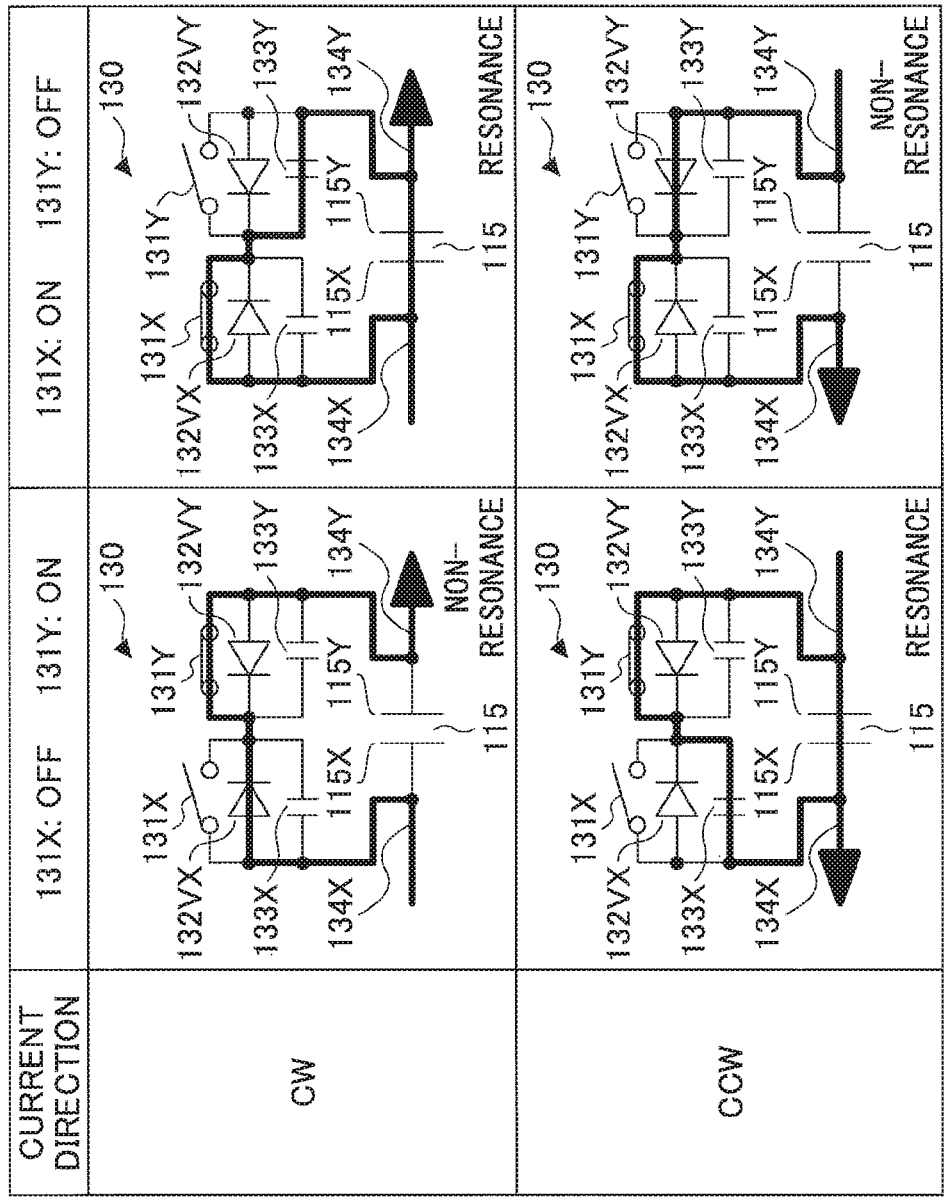
FIG. 17 is a diagram illustrating current paths in a capacitor 115 and an adjuster 130V.

FIG. 17 is a diagram illustrating current paths in the capacitor 115 and the adjuster 130V. In FIG. 17, a current direction will be referred to as the clockwise (CW) direction in which a current flows from the terminal 134X to the terminal 134Y through the capacitor 115 or the inside of the adjuster 130V. Also, a current direction will be referred to as the counterclockwise (CCW) direction in which a current flows from the terminal 134Y to the terminal 134X through the capacitor 115 or the inside of the adjuster 130V.

If the switch 131X is turned off, the switch 131Y is turned on, and a current flows clockwise (CW), the current path generated in the adjuster 130V goes from the terminal 134X to the terminal 134Y through the diode 132VX and the switch 131Y. Since this current path is parallel with the capacitor 115, the current stops flowing in the capacitor 115. Therefore, the resonance current does not flow in the secondary-side resonance coil 110.

If the switch 131X is turned off, the switch 131Y is turned on, and the current flows counterclockwise (CCW), a resonance current flows in the adjuster 130V in the direction from the terminal 134Y to the terminal 134X through the switch 131Y and the capacitor 133X, and the resonance current flows in the capacitor 115 from the terminal 115Y to the terminal 115X. Therefore, the resonance current flows in the secondary-side resonance coil 110 in the counterclockwise direction.

If the switch 131X is turned on, the switch 131Y is turned off, and the current flows clockwise (CW), a resonance current flows in the adjuster 130V in the direction from the terminal 134X to the terminal 134Y through the switch 131X and the capacitor 133Y, and the resonance current flows in the capacitor 115 from the terminal 115X to the terminal 115Y. Therefore, the resonance current flows in the secondary-side resonance coil 110 in the clockwise direction.

If the switch 131X is turned on, the switch 131Y is turned off, and the current flows counterclockwise (CCW), the current path generated in the adjuster 130V goes from the terminal 134Y to the terminal 134X through the diode 132VY and the switch 131X. Since this current path is parallel with the capacitor 115, the current stops flowing in the capacitor 115. Therefore, the resonance current does not flow in the secondary-side resonance coil 110.

Second Embodiment

Figure 18:
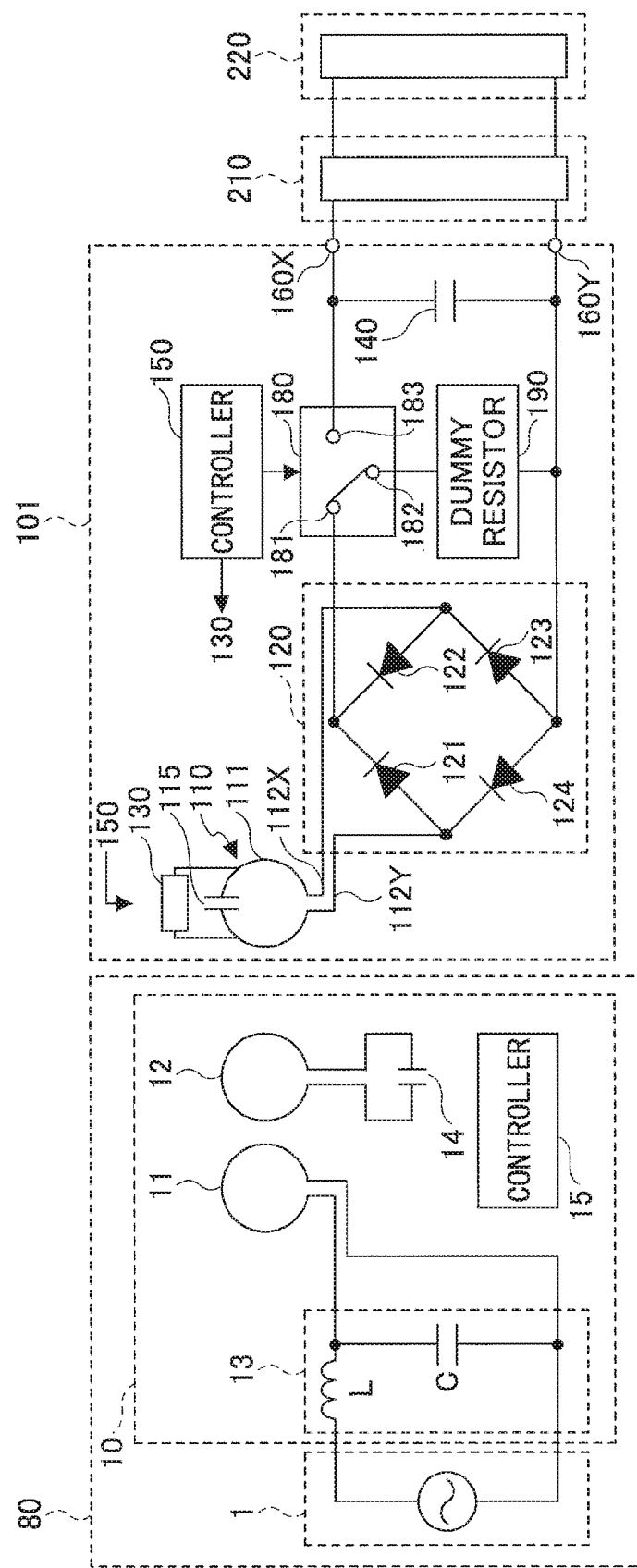
FIG. 18 is a diagram illustrating a power receiver 101 and a power transmission apparatus 80 according to a second embodiment.

FIG. 18 is a diagram illustrating a power receiver 101 and a power transmission apparatus 80 in a second embodiment. The power transmission apparatus 80 is the same as that illustrated in FIG. 4.

The power receiver 101 has a configuration in which a switch 180 and a dummy resistor 190 are added to the power receiver 100 (see FIG. 4) in the first embodiment. Since the other components are the same as those of the power receiver 100, the same codes are assigned to the same components, and their description is omitted.

The switch 180 is a switch that has three terminals 181, 182, and 183. The terminals 181, 182, and 183 are connected to the output terminal on the side of the higher voltage of the rectification circuit 120 (the upper side in the figure), a terminal on the upper side of the dummy resistor 190, and a terminal on the upper side of the smoothing capacitor 140, respectively.

The switch 180 is driven by the controller 150, to switch the connection destination of the terminal 181 to one of the terminals 182 and 183. In other words, the switch 180 switches the connection destination of the output terminal on the side of the higher voltage of the rectification circuit 120 (the upper side in the figure) to one of the terminal on the upper side of the dummy resistor 190, and the terminal on the upper side of the smoothing capacitor 140.

The dummy resistor 190 is connected between the terminal 182 of the switch 180 and a wiring line on the side of the lower voltage that connects the lower terminal of the smoothing capacitor 140 with the output terminal 160Y. The dummy resistor 190 is a resistor whose impedance is equivalent to the impedance of the battery 220.

The dummy resistor 190 is provided to be used, instead of the battery 220, for measuring the power reception efficiency of the power receiver 101. This is because rather than measuring the power reception efficiency by charging the battery 220, it possible to reduce consumed power in measuring the power reception efficiency by flowing a current in the dummy resistor 190 that has the same impedance (resistance) as the battery 220.

The power receiver 101 in the second embodiment determines the phase difference of the driving signal driving the adjuster 130 of the power receiver 101, by using the power reception efficiency measured by using the dummy resistor 190.

Note that the switch 180 may be inserted on a wiring line on the side of the lower voltage that connects the lower terminal of the smoothing capacitor 140 with the output terminal 160Y, between the rectification circuit 120 and the smoothing capacitor 140. In this case, the dummy resistor 190 just needs to be connected between the switch 180 and a wiring line on the side of the higher voltage that connects the upper terminal of the smoothing capacitor 140 and the output terminal 160X.

In the following, the data representing the received power, the rated output, the phase difference, and the like is communicated between the controller 15 of the receiver 10 and the controllers 150A and 150B of the power receivers 101A and 101B. The communication between the controllers 150A and 150B and the controller 15 is executed between the antennas 170A and 170B and the antenna 16 (see FIG. 9).

Figure 19:
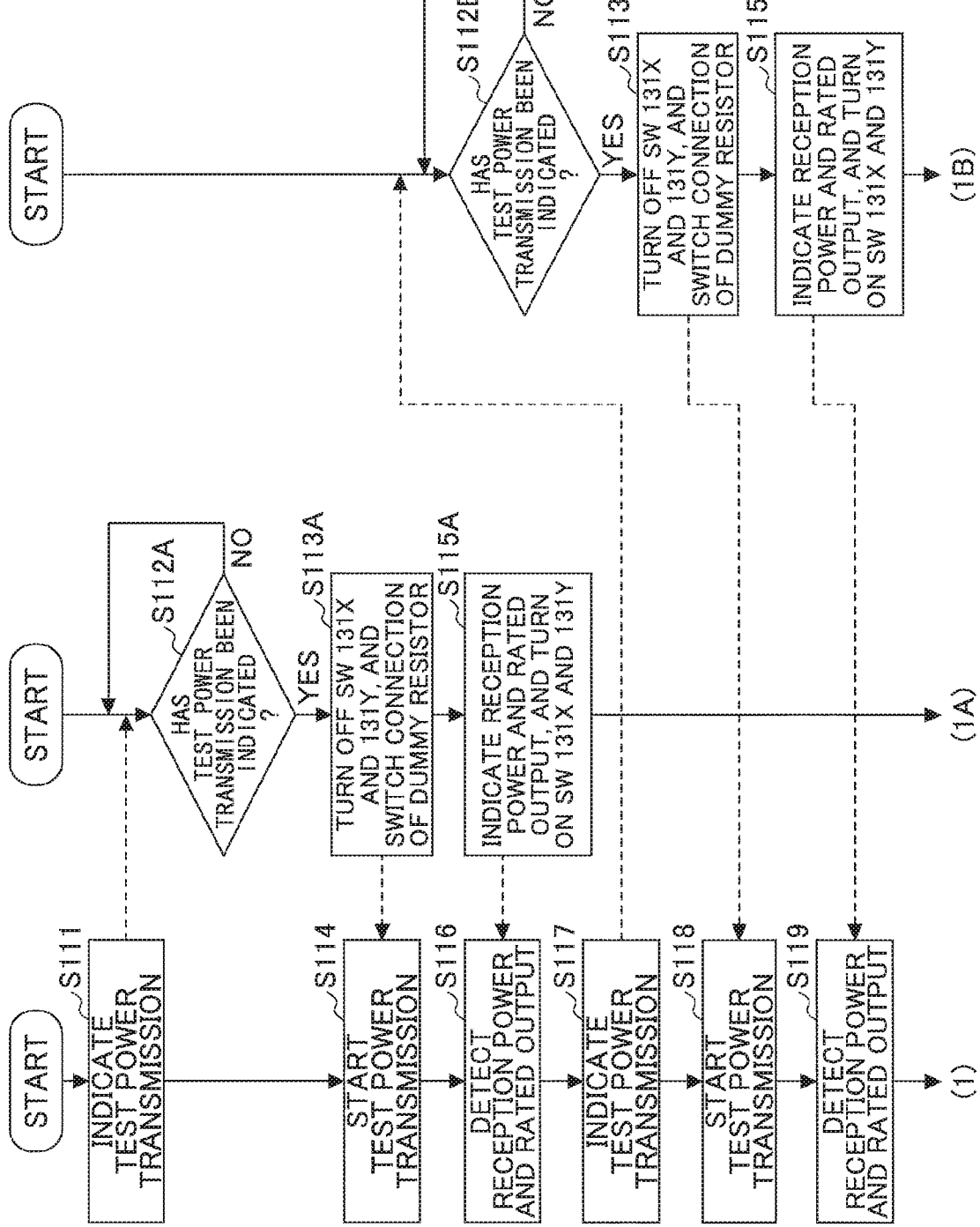
FIG. 19 is a task diagram illustrating a part of a process executed by power receivers 101A, 101B, and a power transmitter 10 to set the phase differences according to the second embodiment.
Figure 20:
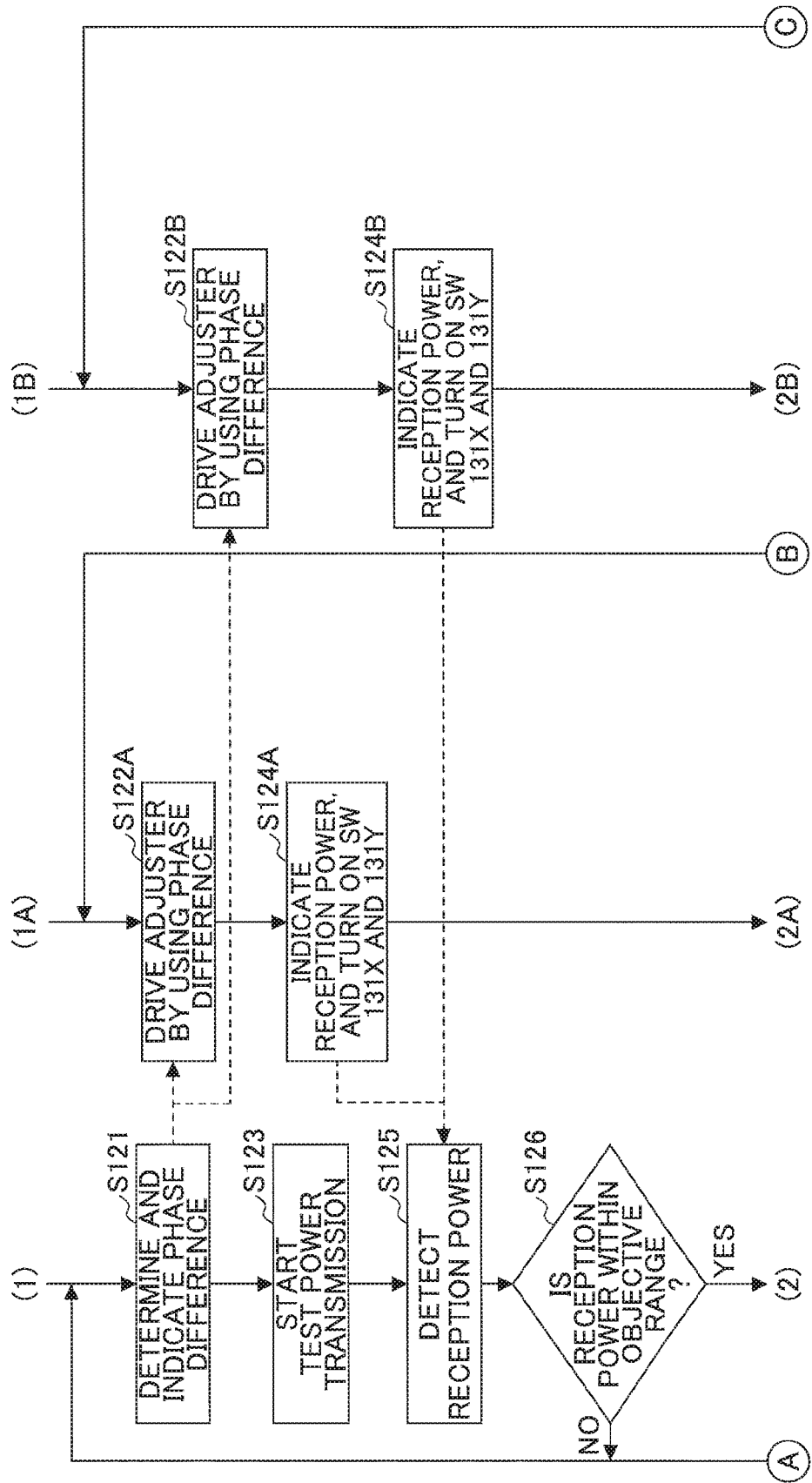
FIG. 20 is a task diagram illustrating a part of the process executed by power receivers 101A, 101B, and a power transmitter 10 to set the phase differences according to the second embodiment.
Figure 21:
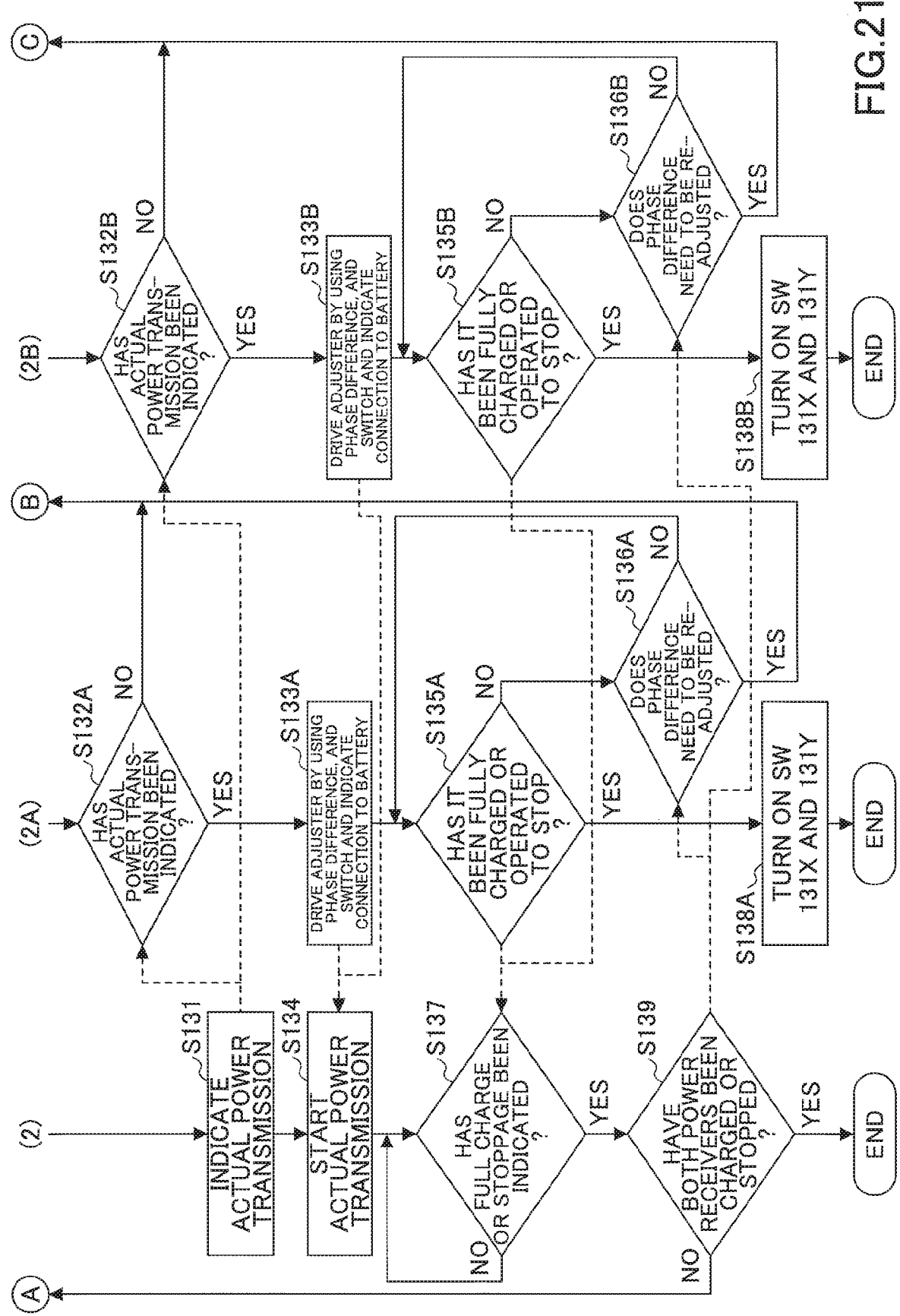
FIG. 21 is a task diagram illustrating a part of the process executed by power receivers 101A, 101B, and a power transmitter 10 to set the phase differences according to the second embodiment.

FIG. 19 through FIG. 21 are task diagrams illustrating a process executed by the power receivers 101A, 101B, and the power transmitter 10 to set the phase differences according to the second embodiment.

The power receivers 101A and 101B have the same configuration as the power receiver 101 illustrated in FIG. 18. Also, the power receivers 101A and 101B receive the power transmitted from the single power transmitter 10 as done by the power receivers 100A and 100B in the first embodiment illustrated in FIG. 9, respectively. Here, to distinguish the two power receivers 101, they are referred to as the power receivers 101A and 101B.

Also, assume in the following description that the power receiver 101A includes a secondary-side resonance coil 110A, a capacitor 115A, a rectification circuit 120A, an adjuster 130A, a smoothing capacitor 140A, a controller 150A, a switch 180A, and a dummy resistor 190A, and has a DC-DC converter 210A and a battery 220A connected (see FIG. 9).

Similarly, assume in the following description that the power receiver 101B includes a secondary-side resonance coil 110B, a capacitor 115B, a rectification circuit 120B, an adjuster 130B, a smoothing capacitor 140B, a controller 150B, a switch 180B, and a dummy resistor 190B, and has a DC-DC converter 210B and a battery 220B connected (see FIG. 9).

Also, the process illustrated in FIG. 19 through FIG. 21 that is executed by the controller 15 of the power transmitter 10 (see FIG. 18) and the controllers 150 of the power receivers 101A and 101B (see FIG. 18) will be simply described as executed by the power transmitter 10 and the power receivers 101A and 101B.

The power transmitter 10 and the power receivers 101A and 101B start preparing for the power transmission (START). The preparation for the power transmission is started with setting a predetermined preparation mode in the power transmitter 10 and the power receivers 101A and 101B, and an indication that requests the power transmission sent from the power receivers 101A and 101B to the power transmitter 10.

Here, the adjuster 130A of the power receiver 101A and the adjuster 130B of the power receiver 101B are turned off (the switches 131X and 131Y are turned on) unless controlled specifically otherwise. In the off state of the adjusters 130A and 130B, the power receivers 101A and 101B are in a state where the resonance by magnetic resonance does not occur (resonance is turned off).

First, the power transmitter 10 transmits an indication of test power transmission to the power receiver 101A (Step S111). Assume here that the power receiver 101A has sent an indication that requests power transmission to the power transmitter 10 earlier than the power receiver 101B. At Step S111, the power transmitter 10 transmits the indication of test power transmission to the power receiver 101A that has sent the indication that requests the power transmission the earliest. Note that the power transmitter 10 distinguishes the power receivers 101A and 101B using identifiers or the like that identify the power receivers 101A and 101B, respectively.

The power receiver 101A determines whether the indication of test power transmission has been received from the power transmitter 10 (Step S112A). Note that the power receiver 101A repeatedly executes Step S112A until having received the indication of test power transmission from the power transmitter 10.

The power receiver 101A turns off the switches 131X and 131Y of the adjuster 130A, and switches the connection destination of the switch 180A to the dummy resistor 190A (Step S113A). Once the switches 131X and 131Y of the adjuster 130A have been turned off, the power receiver 101A transitions to a state where a resonance current flows in the secondary-side resonance coil 110A over the entire period of one cycle of resonance by magnetic resonance. Having completed Step S113A, the power receiver 101A indicates the completion to the power transmitter 10.

The power transmitter 10 starts the test power transmission (Step S114). Accordingly, the power receiver 101A starts receiving the power.

The power receiver 101A controls the amount of shift in the phase shift circuit 153 of the controller 150A to adjust the phase of the two clocks CLK1 and CLK2, and to detect the reference phase in which the maximum power reception efficiency is obtained. Then, the power receiver 101A indicates the received power representing the power received from the power transmitter 10 in the reference phase, and the rated output of the battery 220A to the power transmitter 10, and turns on the switches 131X and 131Y of the adjuster 130A (Step S115A). In this way, the received power that the power receiver 101A indicates to the power transmitter 10 is measured in the reference phase, and hence, is the maximum received power that can be received by the power receiver 101A.

Once the switches 131X and 131Y of the adjuster 130A have been turned on, the power receiver 101A transitions to a state where the resonance by magnetic resonance does not occur even if the power is being received. In other words, the resonance transitions to an off state. The state where the resonance of the power receiver 100A is turned off is a state that does not affect the power receiver 101B measuring the power reception efficiency while receiving power from the power transmitter 10.

The power transmitter 10 receives the data representing the received power and the rated output of the battery 220A transmitted from the power receiver 101A, and detects the received power and the rated output of the power receiver 101A (Step S116).

Next, the power transmitter 10 transmits an indication of test power transmission to the power receiver 101B (Step S117).

The power receiver 101B determines whether the indication of test power transmission has been received from the power transmitter 10 (Step S112B). Note that the power receiver 101B repeatedly executes Step S112B until having received the indication of test power transmission from the power transmitter 10.

The power receiver 101B turns off the switches 131X and 131Y of the adjuster 130B, and switches the connection destination of the switch 180B to the dummy resistor 190B (Step S113B). Once the switches 131X and 131Y of the adjuster 130B have been turned off, the power receiver 101B transitions to a state where a resonance current flows in the secondary-side resonance coil 110B over the entire period of one cycle of resonance by magnetic resonance. Having completed Step S113B, the power receiver 101B indicates the completion to the power transmitter 10.

The power transmitter 10 starts test power transmission (Step S118). Accordingly, the power receiver 101B starts receiving the power.

The power receiver 101B controls the amount of shift in the phase shift circuit 153 of the controller 150B to adjust the phase of the two clocks CLK1 and CLK2, and to detect the reference phase in which the maximum power reception efficiency is obtained. Then, the power receiver 101B indicates the received power representing the power received from the power transmitter 10 in the reference phase, and the rated output of the battery 220B to the power transmitter 10, and turns on the switches 131X and 131Y of the adjuster 130B (Step S115A). In this way, the received power that the power receiver 101B indicates to the power transmitter 10 is measured in the reference phase, and hence, is the maximum received power that can be received by the power receiver 101B.

Once the switches 131X and 131Y of the adjuster 130B have been turned on, the power receiver 101B transitions to a state where the resonance by magnetic resonance does not occur even if the power is being received. In other words, the resonance transitions to an off state.

The power transmitter 10 receives the data representing the received power and the rated output of the battery 220B transmitted from the power receiver 101B, and detects the received power and the rated output of the power receiver 101B (Step S119).

Thus, the process illustrated in FIG. 19 is completed. Note that (1), (1A), and (1B) in the process illustrated in FIG. 19 designate continuation to (1), (1A), and (1B) illustrated in FIG. 20, respectively.

Using the data representing the received power and the rated output of the batteries 220A and 220B received from the power receivers 101A and 101B, the power transmitter 10 determines the phase differences of the driving signals driving the adjusters 130A and 130B of the power receivers 101A and 101B, and indicates the determined phase differences to the power receivers 101A and 101B (Step S121).

The phase difference may be determined by the same method as in the first embodiment.

The power receiver 101A drives the adjuster 130A by using the phase difference received from the power transmitter 10 (Step S122A). Similarly, the power receiver 101B drives the adjuster 130B by using the phase difference received from the power transmitter 10 (Step S122B).

The controller 150A of the power receiver 100A will have detected the reference phase at Step S115A before setting the phase difference of the driving signal at Step S122A.

The controller 150A sets the phase obtained by adding the phase difference received from the power transmitter 10 to the reference phase, as the phase of the two clocks. This is also the same for the controller 150B of the power receiver 100B setting the phase at Step S115B.

The power transmitter 10 starts test power transmission (Step S123). Different from the test power transmission at Step S114 and S118, this test power transmission is a test that transmits power at the same time to both of the power receivers 101A and 101B. The power receivers 101A and 101B measure the received power in a state of receiving the power at the same time, respectively.

The power receiver 101A indicates to the power receiver 101B the received power representing the power received from the power transmitter 10, and turns on the switches 131X and 131Y of the adjuster 130A (Step S124A). Similarly, the power receiver 101B indicates to the power transmitter 10 the received power representing the power received from the power transmitter 10, and turns on the switches 131X and 131Y of the adjuster 130B (Step S124B).

The power transmitter 10 receives the data representing the received power transmitted from the power receivers 101A and 101B, to detect the received power of the power receivers 101A and 101B (Step S125).

The power transmitter 10 determines whether the received power of the power receivers 101A and 101B received at Step S125 is in an objective range (Step S126).

Here, an objective range of the received power is specified, for example, such that the lower limit is 50% of the rated output of the power receiver 101A or 101B, and the upper limit is 130% of the rated outputs of the power receiver 101A or 101B.

Such objective ranges of the received power may be set based on the rated output of the batteries 220A and 220B received by the controller 15 of the power transmitter 10 from the power receivers 101A and 101B at Step S116 and S119, respectively. The objective ranges of the received power as such are used for improving the power reception balance between the power receivers 101A and 101B.

If having determined that a ratio of the received power is not in the objective range at Step S126 (NO at Step S126), the power transmitter 10 returns to Step S121 in the flow. This is to adjust the phase difference again and to confirm whether the power reception efficiency falls in the objective range. Note that if returning to Step S121 to set the phase difference again, the power transmitter 10 just needs, among the power receivers 101A and 101B, to decrease the absolute value of the phase difference of the power receiver whose received power has been below the lower limit of the objective range, and to increase the absolute value of the phase difference of the power receiver whose received power has been over the upper limit of the objective range.

Thus, the process illustrated in FIG. 20 is completed. Note that (2), (2A), and (2B) in the process illustrated in FIG. 20 designate continuation to (2), (2A), and (2B) illustrated in FIG. 21, respectively.

If having determined that the received power is in the objective range (YES at Step S126), the power transmitter 10 transmits an indication of actual power transmission representing that the actual power transmission is to be executed to the power receivers 101A and 101B (Step S131). The actual power transmission means, unlike the test power transmission, transmitting power to actually charge the power receivers 101A and 101B. The indication of actual power transmission means an indication made by the power transmitter 10 to inform the power receivers 101A and 101B that the actual power transmission is to be executed.

The power receiver 101A determines whether the indication of actual power transmission has been received from the power transmitter 10 (Step S132A). Similarly, the power receiver 101B determines whether the indication of actual power transmission has been received from the power transmitter 10 (Step S132B).

Note that if having not received the indication of actual power transmission, the power receivers 101A and 101B return to Step S122A and 122B in the flow, respectively. This is because not receiving the indication corresponds to the case where the power transmitter 10 has determined at Step S126 that the received power is not in the objective range, and it is necessary for the power transmitter 10 to return to Step S121, and to drive the adjusters 130A and 130B by using the phase differences to be transmitted to the power receivers 101A and 101B.

If having determined that the indication of actual power transmission from the power transmitter 10 has been received (YES at Step S132A), the power receiver 101A resumes driving the adjuster 130A by using the phase difference, switches the connection destination of the switch 180A to the battery 220A, and indicates to the power transmitter 10 that the switching has been completed (Step S133A). Similarly, if having determined the indication of actual power transmission from the power transmitter 10 has been received (YES at Step S132B), the power receiver 101B resumes driving the adjuster 130B by using the phase difference, switches the connection destination of the switch 180B to the battery 220B, and indicates to the power transmitter 10 that the switching has been completed (Step S133B).

The power transmitter 10 starts the actual power transmission (Step S134).

The power receiver 101A determines whether the battery 220A has been fully charged, or there has been a charge stop operation by the user (Step S135A). Similarly, the power receiver 101B determines whether the battery 220B has been fully charged, or there has been a charge stop operation by the user (Step S135B).

If having determined that it is not fully charged or no charge stop operation has been received (NO at Step S135A), the power receiver 101A determines whether the phase difference needs to be readjusted (Step S136A).

For example, if the power receiver 101B has transitioned to a state of not being charged because of full charge completion or a charge stop operation, the phase difference of the power receiver 101A needs to be readjusted. Therefore, if the power transmitter 10 has determined that charging the power receiver 101B has been completed or the charging has been stopped at Step S139, which will be described later, and the power receiver 101A has received an indication about charging completion or charging stoppage of the power receiver 101B from the power transmitter 10, the power receiver 101A determines that the phase difference needs to be readjusted.

If having determined that it is not fully charged or no charge stop operation has been received (NO at Step S135B), the power receiver 101B determines whether the phase difference needs to be readjusted (Step S136B).

For example, if the power receiver 101A has transitioned to a state of not being charged because of full charge completion or a charge stop operation, the phase difference of the power receiver 101B needs to be readjusted. Therefore, if the power transmitter 10 has determined that charging the power receiver 101A has been completed or the charging has been stopped at Step S139, which will be described later, and the power receiver 101B has received an indication about charging completion or charging stoppage of the power receiver 101A from the power transmitter 10, the power receiver 101B determines that the phase difference needs to be readjusted.

If having determined that the battery 220A has been fully charged or a charge stop operation has been received (YES at Step S135A), the power receiver 101A indicates completion of the charging or reception of the stop operation to the power transmitter 10. Accordingly, the power receiver 101A ends the process.

Similarly, if having determined that the battery 220B has been fully charged or a charge stop operation has been received (YES at Step S135B), the power receiver 101B indicates completion of the charging or reception of the stop operation to the power transmitter 10. Accordingly, the power receiver 101B ends the process.

The power transmitter 10 determines whether the charging has been completed or there has been a stop operation on the power receiver 101A or 101B (Step S137). The power transmitter 10 executes the determination at Step S137 based on whether there has been an indication representing completion of the charging or a stop operation from the power receiver 101A or 101B. Note that the determination at Step 137 is repeatedly executed until the indication comes from the power receiver 101A or 101B that represents completion of the charging or a stop operation.

After having indicated the full charge or the charge stop operation of the battery 220A to the power transmitter 10, the power receiver 101A turns on the switches 131X and 131Y of the adjuster 130A (Step S138A). Accordingly, the power receiver 101A transitions to a state of not receiving the power. Similarly, after having indicated the full charge or the charge stop operation of the battery 220B to the power transmitter 10, the power receiver 101B turns on the switches 131X and 131Y of the adjuster 130B (Step S138B). Accordingly, the power receiver 101B transitions to a state of not receiving the power.

If having determined that an indication has come from the power receiver 101A or 101B that represents completion of the charging or a stop operation (YES at Step S137), the power transmitter 10 determines whether the charging has been completed or stopped on both of the power receivers 101A and 101B (Step S139). This is because if the charging has not been completed or stopped on at least one of the power receivers 101A and 101B, it is necessary to continue to transmit power.

If having determined that the charging has not been completed or stopped on at least one of the power receivers 101A and 101B (NO at Step S139), the power transmitter 10 returns to Step S121 in the flow for setting the phase differences again to transmitting the power.

Also, if having determined that the charging has been completed or stopped on the power receiver 101A, the power transmitter 10 indicates to the power receiver 101B that the charging has been completed or stopped on the power receiver 101A. Similarly, if having determined that the charging has been completed or stopped on the power receiver 101B, the power transmitter 10 indicates to the power receiver 101A that the charging has been completed or stopped on the power receiver 101B.

If having determined that the charging has been completed or stopped on both of the power receivers 101A and 101B (YES at Step S139), the power transmitter 10 ends the process.

Thus, the process for transmitting the power to the power receivers 101A and 101B by the power transmitter 10 is completed.

Note that so far, the embodiment has been described in which the phase differences are determined assuming that the two power receivers 101A and 101B receive the power from the power transmitter 10. However, the phase differences can be determined similarly if three or more power receivers receive the power from the power transmitter 10. For example, if there are three power receivers, after Step S115B has been completed, substantially the same steps as Step 111, S112A, S113A, S114, S115A, and S116 may be applied to a third power receiver to have the power transmitter 10 obtain the power and rated output of the third power receiver.

Then, after having determined the phase difference of the three power receivers and having determined whether the received power is in the objective range, the actual power transmission may be executed. This is substantially the same for four or more power receivers.

Thus, according to the second embodiment, it is possible to provide the power receiver 101A or 101B with which the balance of power supply can be improved. Also, according to the second embodiment, it is possible to provide a power transmission system that can improve the balance of power supply.

Also, in the second embodiment, when determining the phase differences of the power receivers 101A and 101B, the process of test power transmission is executed by Steps S121-S126. Then, as a result of the test power transmission, if the received power of the power receivers 101A and 101B is out of the objective range, the phase differences are readjusted to obtain the phase differences that can further improve the power reception balance.

Therefore, according to the second embodiment, it is possible to provide the power receiver 101A or 101B with which the balance of power supply can be better improved.

Third Embodiment

Figure 22:
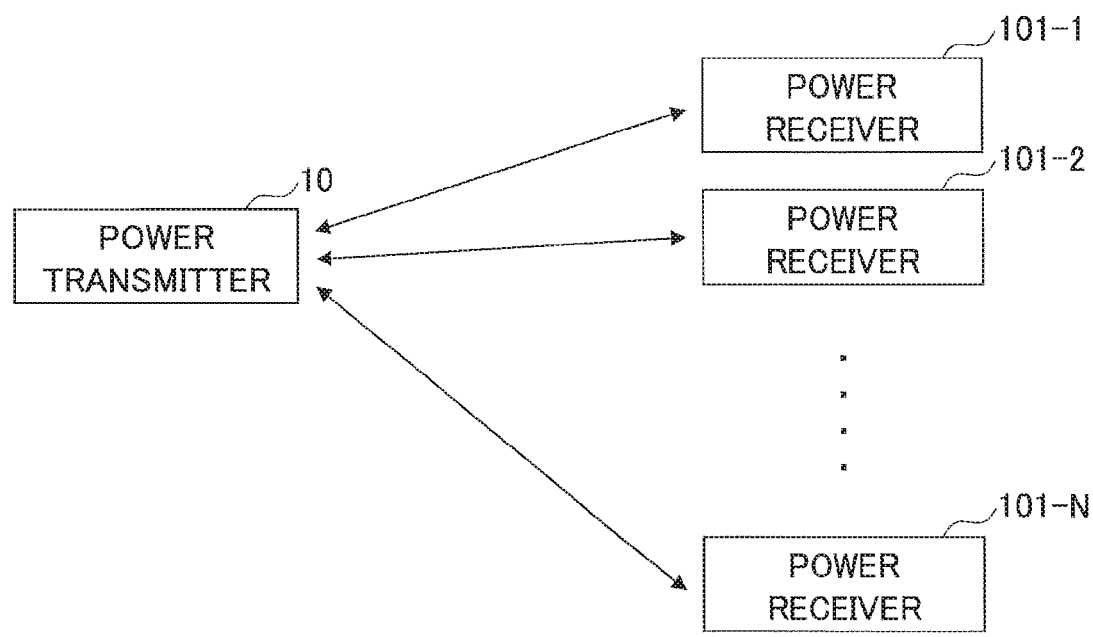
FIG. 22 is a diagram illustrating a power transmitter 10 and N units of power receivers 101-1, 101-2, . . . , and 101-N according to a third embodiment.
Figure 23:
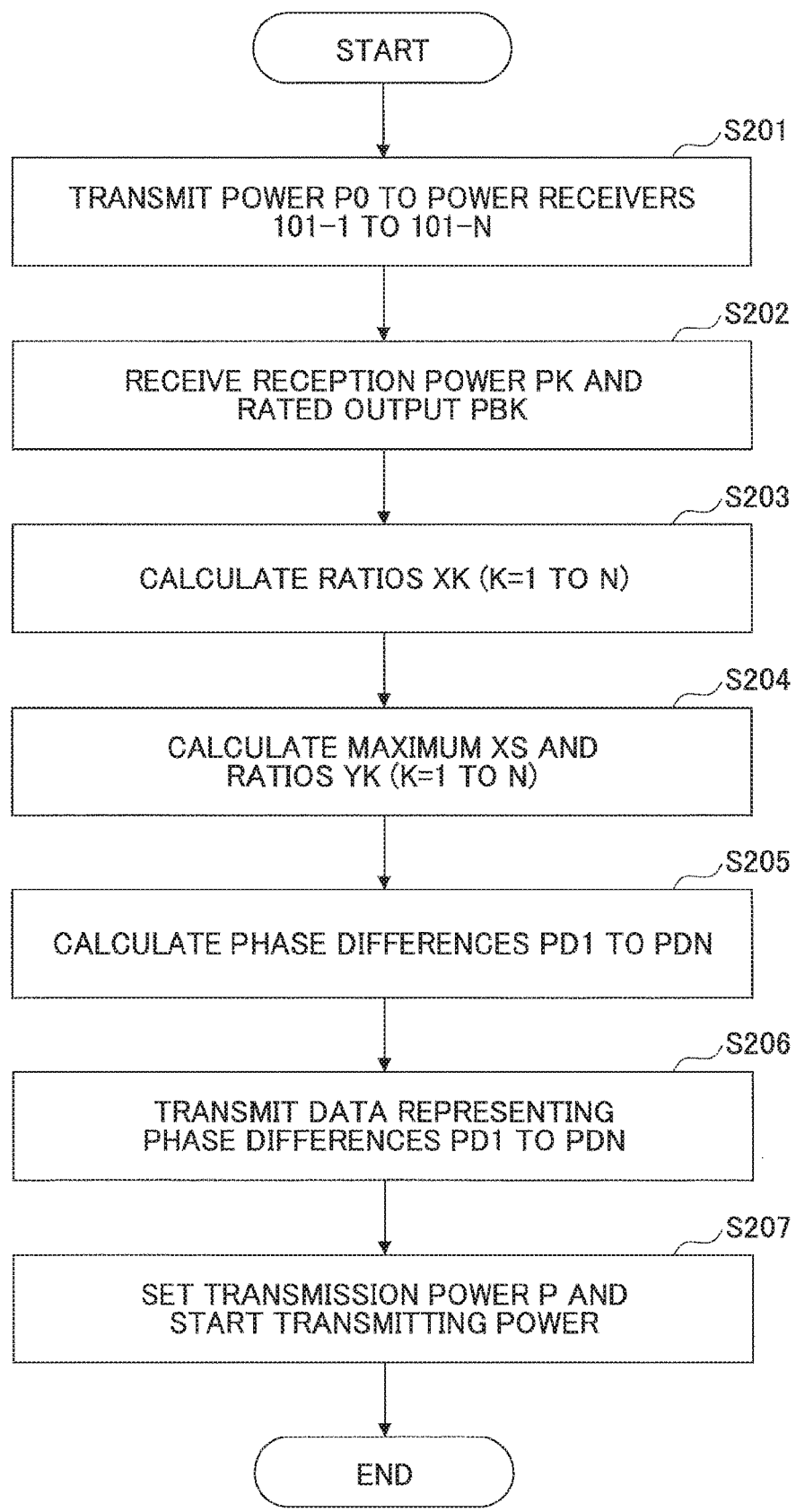
FIG. 23 is a flowchart illustrating a process for determining the phase differences and power transmission output P according to the third embodiment.

FIG. 22 is a diagram illustrating a power transmitter 10 and N units of power receivers 101-1, 101-2, . . . , and 101-N according to a third embodiment. FIG. 23 is a flowchart illustrating a process for determining the phase differences and power transmission output P according to the third embodiment. FIG. 24 is a diagram illustrating tabular format data used in the third embodiment.

In the third embodiment, a method will be described for determining the phase differences of the driving signals driving the adjusters 130 of the power receivers 101-1 to 101-N when the power is transmitted from the single power transmitter 10 to the N units of the power receivers 101-1, 101-2, . . . , 101-N.

Here, N is a selectable integer greater than or equal to 2.

Each of the power receivers 101-1 to 101-N has the same configuration as the power receivers 101A and 101B in the second embodiment. Also, description here will assume that the DC-DC converter 210 and the battery 220 are connected to each of the power receivers 101-1 to 101-N.

In the following, the data representing the received power, the phase difference, and the like is communicated between the controllers 150 of the power receivers 101-1 to 101-N and the controller 15 of the receiver 10, respectively. The communication between the controller 150 and the controller 15 is executed between the antenna 170 and the antenna 16 (see FIG. 9).

In the third embodiment, the phase difference of the driving signal driving the adjuster 130 included in each of the power receivers 101-1 to 101-N is specifically determined by the following steps.

First, the power transmitter 10 transmits the power P0 to each of the power receivers 101-1 to 101-N individually (Step S201). Also, having received the power P0, each of the power receivers 101-1 to 101-N transmits the data representing the received power PK (K=1 to N) and the rated output PBK (K=1 to N) of the battery 220 to the power transmitter 10.

Next, the power transmitter 10 receives the data representing the received power PK (K=1 to N) and the rated output PBK (K=1 to N) of the battery 220 (Step S202).

The received power PK is measured in each of the power receivers 101-1 to 101-N by connecting the switch 180 to the dummy resistor 190. The rated output PBK is the rated output of the battery 220 connected to each of the power receivers 101-1 to 101-N. The data representing the rated output of the battery 220 is held in the internal memory of the controller 150 of each of the power receivers 101-1 to 101-N.

Since the power is transmitted to each of the power receivers 101-1 to 101-N one-to-one, the power transmitter 10 transmits the power N times. Note that the power P0 transmitted to each of the power receivers 101-1 to 101-N is equivalent for each of the power receivers 101-1 to 101-N.

Next, for each of the power receivers 101-1 to 101-N, the power transmitter 10 obtains the ratio XK (K=1 to N) of the rated output PBK (K=1 to N) with respect to the received power PK (K=1 to N) (Step S203). This is obtained by XK=PBK/PK.

Next, the power transmitter 10 calculates the maximum XS among the ratios XK, and for each of the power receivers 101-1 to 101-N, obtains the ratio YK (K=1 to N) of the ratio XK with respect to the maximum XS (Step S204). This is obtained by YK=XK/XS.

Next, the power transmitter 10 obtains the phase differences D1-DN that make the received power of the power receivers 101-1 to 101-N greater by Y1-YN times, respectively (Step S205). To obtain the phase differences D1-DN achieving the factors of Y1-YN, for example, a tabular format may be used as illustrated in FIG. 24.

The tabular format data illustrated in FIG. 24 is data in which a combination of the ratios Y1-YN is associated with a combination of the phase differences D1-DN. The combinations of the ratios Y1-YN include Ya1, Ya2, . . . , YaN, Yb1, Yb2, . . . , YbN, and so on. The combinations of the values of the phase differences D1-DN include Da1, Da2, . . . , DaN, Db1, Db2, . . . , DbN, and so on.

Ya1, Ya2, . . . , YaN in a combination of the ratios Y1-YN are associated with Da1, Da2, . . . , DaN in a combination of the phase differences D1-DN, respectively. Yb1, Yb2, . . . , YbN in a combination of the ratios Y1-YN are associated with Db1, Db2, . . . , DbN in a combination of the phase differences D1-DN, respectively.

Such data items associating the combinations of the ratios Y1-YN with the combinations of the phase differences D1-DN may be prepared at a considerable number so as to obtain the phase differences D1-DN corresponding to the ratios Y1-YN calculated for the power receivers 101-1 to 101-N at Step S204, from the tabular format illustrated in FIG. 24.

Note that if a combination of the ratios Y1-YN calculated for the power receivers 101-1 to 101-N at Step S204 does not exist in the data of the tabular format illustrated in FIG. 24, one of the phase differences D1-DN may be used that is associated with one of the ratios Y1-YN close to one of the ratios Y1-YN calculated at Step S204. Alternatively, if a combination of the ratios Y1-YN calculated at Step S204 does not exist in the data illustrated in FIG. 24, an interpolation or the like may be applied for obtaining the ratios Y1-YN close to the combination of the ratios Y1-YN calculated at Step S204, to use the phase differences D1-DN.

Also, so far, the embodiment has been described in which the phase differences D1-DN are obtained by using the tabular format data illustrated in FIG. 24. However, the phase differences D1-DN may also be calculated, for example, depending on the values of the ratios Y1-YN. The value of the ratios Y1-YN is 1 if the ratio XK is the maximum XS, or otherwise less than 1. Therefore, the greater the value of the ratios Y1-YN, the more the electrical power to be received is required. Therefore, the phase differences D1-DN may be set for greater values when the values of the ratios Y1-YN are greater, and the phase differences D1-DN may be set for smaller values when the values of the ratios Y1-YN are smaller.

Next, the power transmitter 10 transmits the data representing the phase differences D1-DN to the power receivers 101-1 to 101-N, respectively (Step S206).

Finally, the power transmitter 10 sets the power transmission output P by the following formula (Step S207).

$$P = \sum_{K=1}^{N} XK \times PK$$

Thus, setting the phase differences D1-DN and the power transmission output P is completed.

As described above, according to the third embodiment, it is possible to provide the power receivers 101-1 to 101-N with which the balance of power supply can be improved. Also, according to the third embodiment, it is possible to provide the power transmission system (the power receivers 101-1 to 101-N and the power transmitter 10) that can improve the balance of power supply.

So far, the power receiver and the power transmission system have been described according to the embodiments. Note that the present invention is not limited to the specific embodiments, but various changes and modifications are possible within the scope of the present invention described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power receiver comprising:
    a secondary-side resonance coil including a resonance coil part to receive power from a primary-side resonance coil by magnetic resonance generated with the primary-side resonance coil;
    a capacitor inserted in series in the resonance coil part of the secondary-side resonance coil;
    a series circuit constituted with a first switch and a second switch, and connected in parallel with the capacitor;
    a first rectifier connected in parallel with the first switch, and having a first rectification direction;
    a second rectifier connected in parallel with the second switch, and having a second rectification direction opposite to the first rectification direction;
    a detector configured to detect a voltage waveform or a current waveform of a power supply supplied to the secondary-side resonance coil; and
    a controller configured to adjust the voltage waveform or the current waveform detected by the detector, and a phase difference between a first signal to switch on and off the first switch and a second signal to switch on and off the second switch, so as to adjust the power to be received by the secondary-side resonance coil.

2. The power receiver as claimed in claim 1, wherein the controller adjusts the phase difference to adjust a ratio of a state where resonance does not occur in the resonance coil part to a state where resonance occurs in the resonance coil part, so as to adjust the power to be received by the secondary-side resonance coil.

3. The power receiver as claimed in claim 2, wherein the secondary-side resonance coil further includes a first terminal and a second terminal provided at both ends of the resonance coil part, respectively,
    wherein the first rectifier and the second rectifier respectively have a first current input terminal and a second current input terminal, and the first rectifier and the second rectifier are respectively connected in parallel with the first switch and the second switch in a state where the first current input terminal and the second current input terminal are connected,
    wherein the controller turns off the first switch and turns on the second switch when a current flows in the resonance coil part from the first terminal to the second terminal, and turns on the first switch and turns off the second switch when the current flows in the resonance coil part from the second terminal to the first terminal, to generate resonance in the resonance coil part by the magnetic resonance.

4. The power receiver as claimed in claim 3, wherein the controller turns on the first switch and turns off the second switch when a current flows in the resonance coil part from the first terminal to the second terminal, and turns off or on the first switch and turns on the second switch when the current flows in the resonance coil part from the second terminal to the first terminal, so as to generate a state where resonance does not occur in the resonance coil part by the magnetic resonance.

5. The power receiver as claimed in claim 1, further comprising:
    a communication unit configured to receive a voltage waveform or a current waveform of a power supply supplying power to the primary-side resonance coil,
    wherein the detector detects the voltage waveform or the current waveform of the power supply supplied to the secondary-side resonance coil, based on the voltage waveform or the current waveform of the power supply supplied to the primary-side resonance coil received by the communication unit.

6. The power receiver as claimed in claim 1, wherein the detector detects the voltage waveform or the current waveform of the power supplied to the secondary-side resonance coil.

7. The power receiver as claimed in claim 3, wherein the first rectifier and the second rectifier respectively have a first current output terminal and a second current output terminal, and the first rectifier and the second rectifier are respectively connected in parallel with the first switch and the second switch in a state where the first current output terminal and the second current output terminal are connected, wherein the controller turns on the first switch and turns off the second switch when a current flows in the resonance coil part from the first terminal to the second terminal, and turns off the first switch and turns on the second switch when the current flows in the resonance coil part from the second terminal to the first terminal, to generate resonance in the resonance coil part by the magnetic resonance.

8. The power receiver as claimed in claim 7, wherein the controller turns off or on the first switch and turns on the second switch when a current flows in the resonance coil part from the first terminal to the second terminal, and turns on the first switch and turns off or on the second switch when the current flows in the resonance coil part from the second terminal to the first terminal, so as to generate a state where resonance does not occur in the resonance coil part by the magnetic resonance.

9. The power receiver as claimed in claim 1, further comprising:
a rectification circuit connected to a first terminal and a second terminal to rectify AC power input from the secondary-side resonance coil;
a smoothing circuit connected on the output side of the rectification circuit; and
a pair of output terminals connected on the output side of the smoothing circuit.

10. A power transmission system, comprising:
a power transmitter including a primary-side resonance coil; and
a first power receiver configured to receive power from the power transmitter,
wherein the first power receiver includes
a secondary-side resonance coil including a resonance coil part to receive the power from the primary-side resonance coil by magnetic resonance generated with the primary-side resonance coil,
a capacitor inserted in series in the resonance coil part of the secondary-side resonance coil,
a series circuit constituted with a first switch and a second switch, and connected in parallel with the capacitor,
a first rectifier connected in parallel with the first switch, and having a first rectification direction,
a second rectifier connected in parallel with the second switch, and having a second rectification direction opposite to the first rectification direction,
a detector configured to detect a voltage waveform or a current waveform of a power supply supplied to the secondary-side resonance coil, and
a controller configured to adjust the voltage waveform or the current waveform detected by the detector, and a phase difference between a first signal to switch on and off the first switch and a second signal to switch on and off the second switch, so as to adjust the power to be received by the secondary-side resonance coil.

11. The power transmission system as claimed in claim 10, further comprising:
a second power receiver including a second secondary-side resonance coil to receive the power from the power transmitter,
wherein the phase difference is set based on
a first power reception efficiency of the first secondary-side resonance coil,
a first rated output of a first load connected to the pair of output terminals,
a second power reception efficiency of the second secondary-side resonance coil, and
a second rated output of a second load to which power is supplied from the second power receiver,
wherein the controller adjusts a phase difference with respect to the second signal to switch on and off the second switch, to the set phase difference.

* * * * *